United States Patent [19]

Nakadai et al.

[11] Patent Number: 5,732,394
[45] Date of Patent: Mar. 24, 1998

[54] METHOD AND APPARATUS FOR WORD SPEECH RECOGNITION BY PATTERN MATCHING

[75] Inventors: Yoshio Nakadai, Yokohama; Tetsuma Sakurai, Tokyo; Yutaka Nishino, Miura, all of Japan

[73] Assignee: Nippon Telegraph and Telephone Corporation, Tokyo, Japan

[21] Appl. No.: 630,668

[22] Filed: Apr. 10, 1996

[30] Foreign Application Priority Data

Jun. 19, 1995 [JP] Japan ................... 7-151698
Jun. 22, 1995 [JP] Japan ................... 7-155793
Mar. 6, 1996 [JP] Japan ................... 8-048980

[51] Int. Cl.$^6$ .................. G10L 5/06; G10L 9/00
[52] U.S. Cl. ............... 704/255; 704/252; 704/238; 704/243
[58] Field of Search ................... 704/233, 238, 704/239, 241, 243, 246, 248, 251, 252, 253, 255

[56] References Cited

U.S. PATENT DOCUMENTS

| | | | |
|---|---|---|---|
| 4,852,181 | 7/1989 | Morito et al. | 704/233 |
| 4,918,735 | 4/1990 | Morito et al. | 704/233 |
| 4,979,212 | 12/1990 | Yamada et al. | 704/251 |
| 4,984,275 | 1/1991 | Watanabe et al. | 704/251 |
| 5,220,609 | 6/1993 | Watanabe et al. | 704/252 |
| 5,222,190 | 6/1993 | Pawate et al. | 704/200 |
| 5,309,547 | 5/1994 | Niyada et al. | 704/238 |
| 5,355,432 | 10/1994 | Tanaka et al. | 704/234 |
| 5,369,727 | 11/1994 | Nomura et al. | 704/252 |

*Primary Examiner*—Allen R. MacDonald
*Assistant Examiner*—Patrick N. Edouard
*Attorney, Agent, or Firm*—Pollock, Vande Sande & Priddy

[57] ABSTRACT

In a word speech recognition method which performs pattern matching between unknown speech pattern and multiple reference templates and detects that one of the reference templates which provides the smallest one of distance measures detected between the unknown speech pattern and the reference templates, when the difference d between the speech period length of the unknown speech pattern and the speech period length of a selected reference template exceeds a fixed threshold value $\epsilon_1$, partial patterns are extracted from the unknown speech pattern, each starting at a different position, and the minimum one of the distances obtained by pattern matching between these extracted partial patterns and the selected reference template is determined to be the distance between the selected reference template and the unknown speech pattern. When the difference d is in the range of $-\epsilon_2 \leq d \leq \epsilon_1$, pattern matching is performed between speech periods of the unknown speech pattern and the reference templates with their variation periods eliminated therefrom at their both ends.

16 Claims, 11 Drawing Sheets

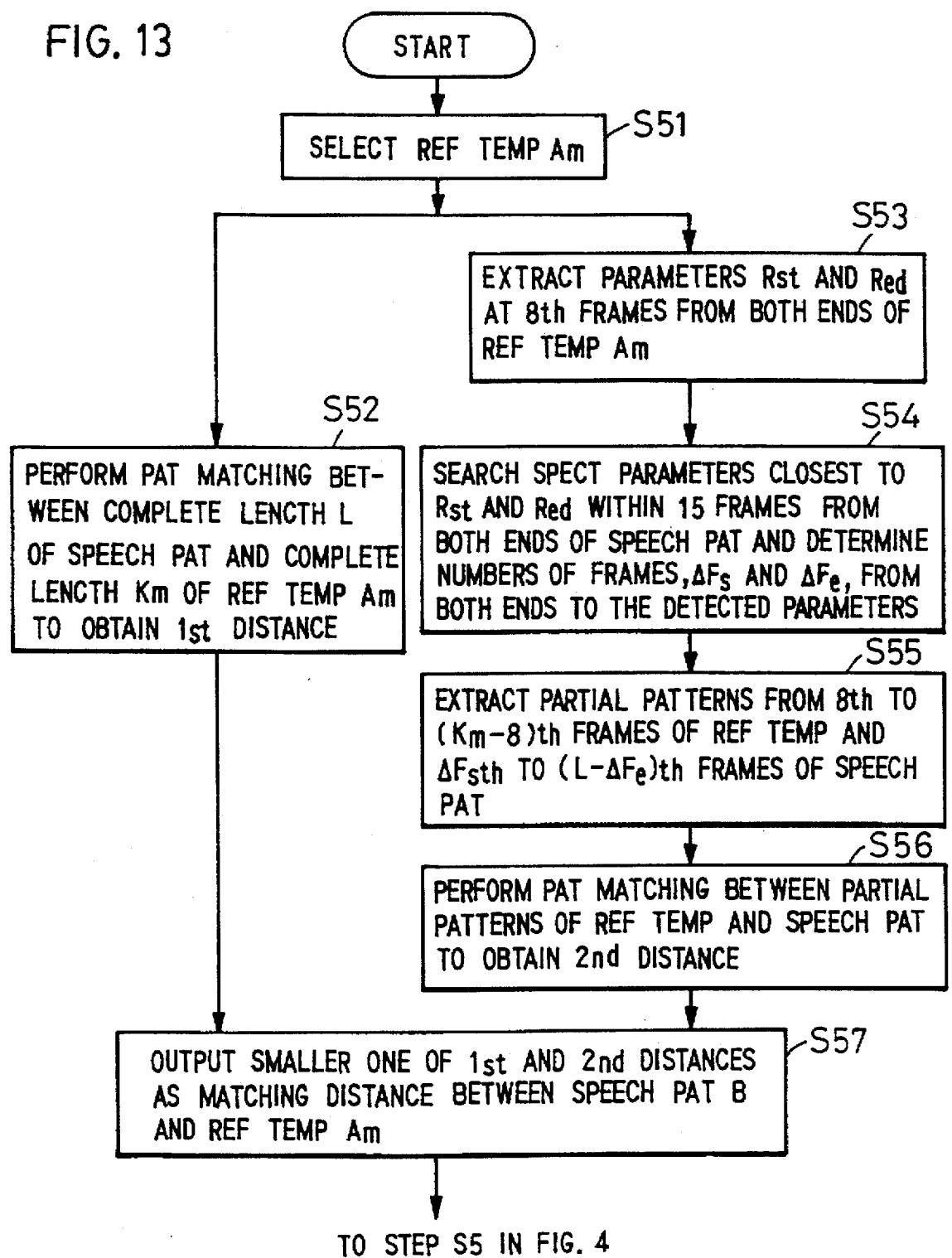

METHOD AND APPARATUS FOR WORD SPEECH RECOGNITION BY PATTERN MATCHING

BACKGROUND OF THE INVENTION

The present invention relates to a method and apparatus for word speech recognition by pattern matching and, more particularly, to a method which recognizes speech inputted in units of words by matching it with multiple pre-registered word speech reference templates and outputs the recognition results as characters or some other symbols and an apparatus for implementing such a word speech recognition method.

There has been studied and developed what is called speech recognition technology of manipulating electrical machinery and apparatus in response to commands in speech instead of manual operation. It is an ideal of the speech recognition technology to achieve a 100% recognition of speech of an arbitrary length uttered by a person at an arbitrary position with arbitrary timing. However, to catch particular speech uttered at an arbitrary time in an actual high-noise use environment, it is necessary that speech input processing always execute a complex algorithm that detects speech endpoints again and again from the input signal period observed together with noises while at the same time eliminating the noise periods—this involves an enormous amount of computation. To avoid this, there has been developed a simple isolated word speech recognition technique that detects start and end points of speech only once in a fixed period of time.

To facilitate a better understanding of the present invention, a description will be given first, with reference to FIG. 1, of an example of isolated word speech recognizers now in common use. A speech input part 11 transduces input speech into a speech signal waveform by a microphone or similar acousto-electrical transducer. An A/D converting part 12 converts the speech signal waveform into a digital speech signal waveform represented by a sequence of digital values sampled with a fixed period. A spectral parameter extracting part 13 extracts from the digital speech signal waveform spectral parameters necessary for speech recognition. A trigger switch 14 triggers the speech endpoint detection for word speech recognition. A speech endpoint detecting part 15 determines one start point and one end point of speech on the basis of a change in the speech spectral parameters available from the speech spectral parameter extracting part 13. An unknown pattern register 16 stores, as an unknown speech pattern, the speech spectral parameters from the speech start to end point determined in the speech endpoint detecting part 15.

In a reference template storage part 17 there are stored, as labeled reference patterns, speech patterns each composed of a sequence of spectral parameters in the speech period of registered word speech, the speech patterns being generated by the same procedure as that of speech recognition by the spectral parameter extracting part 13, the trigger switch 14, the speech endpoint detecting pat 15 and the unknown speech pattern register 16. A pattern matching part 18 performs matching between the unknown speech pattern stored in the unknown speech pattern register 16 and the reference templates stored in the reference templates storage part 17, then outputs the distance measure between each reference template and the unknown speech pattern. The distance measure is a distance measure in terms of spectral parameters that is defined by the Mahalanobis distance or other mathematical expressions. A recognition result output part 19 determines the reference template that corresponds to the smallest one of the distance measures between the respective reference templates and the unknown speech pattern, then outputs the label name of that reference template to a host computer (not shown) that governs the operation of the automatic speech recognizer. The host computer controls the operations of the respective parts 12 to 19 according to its internally stored programs that describe the speech recognition procedure.

Next, the operation of the automatic speech recognizer shown in FIG. 1 will be described. Speech is always converted into a digital speech signal in the speech input part 11 and in the A/D converting part 12, and in the spectral parameter extracting part 13 it is analyzed for each frame (for instance, 128 sample: 16 msec) and spectral parameters are extracted. The power of the speech signal, which is a piece of information contained in the analysis result, is sent to the speech endpoint detecting part 15 for use as information about the speech endpoint detection. The speech recognition generally means the recognition of phoneme information. As preprocessing for LPC analyzing the spectral envelope of a speech signal representing the phoneme information for each short-time frame, the auto-correlation function of the input signal is calculated. A zeroth-order auto-correlation function obtained by the analysis corresponds to the short-time power value of the input signal of that frame. From the viewpoint of numerical representation, it is generally convenient to express the signal power as logarithmic power.

Now, assume that a speaker or the host computer, which operates the automatic speech recognizer, starts the trigger switch 14 to trigger the speech endpoint detection. The speech endpoint detecting part 15 is initialized to start the detection of the speech start point on the basis of information that is inputted from the spectral parameter extracting part 13. The speech start point can be detected by a method that, for example, when the signal power value larger than a fixed threshold value lasts for a fixed period of time, the rise position of the signal power value is defined as the start point. Next, the speech endpoint detecting part 15 detects the point of attenuation of the signal power value as the speech end point, finishing its operation.

A sequence of spectral parameters from the speech start to end point detected by the speech endpoint detecting part, which is contained in the results of analysis by the spectral extracting part 13, is stored as an input speech pattern in the unknown speech pattern register 16. Upon completion of the storage of the unknown speech pattern, the pattern matching part 18 matches the unknown speech pattern with the content of each reference template stored in the reference template storage part 17 by a DTW (Dynamic Time Warping) matching or similar pattern matching scheme and calculates the distance measure between them. The distance measure calculated for each reference template is compared with the smallest-ever distance measure in the result output part 19 and, when the former is smaller than the latter, the label name of the reference template corresponding to the smallest distance measure is provided from the output part 19 to the host computer.

Such a word speech recognizer as described above is required to be particularly accurate in the speech endpoint detection. One possible method for the speech endpoint detection is to accurately extract only the speech period by, for example, subjecting all information by the spectral parameter extraction to Artificial Neural Network (ANN) or similar filtering. Since the operation for this extraction leads to extensive processing and calls for about the same computational complexity as needed for ordinary speech recognition, however, the speech period is detected in many instances through utilization of the speech power, the number of zero crossings, or some other simple information that permits the detection of the speech period with a relatively small amount of computation. Further, to prevent a portion of speech from being left undetected in the speech endpoint detection, the threshold value for the speech period detection is usually determined in accordance with an average feature parameter value of the noise period.

In FIG. 2 there is schematically illustrated speech extracted by the speech endpoint detecting method described above. This example is one that used the speech signal power to extract the speech period. In FIG. 2 reference numeral 2A denotes a period of what is called a lip noise recorded when the speaker began to move his lips for utterance, 2B a true speech period, 2C a breathing noise period after utterance, and 2D a period of ambient noise or transmission noise generated in the electrical transmission system to the speech input part. FIG. 2 indicates the possibility that when the speech input part 11 is close to the speaker's mouth as in the case of a telephone handset, the periods of lip noise and breathing noise, which differ from average noise, precede and follow the true speech period, respectively, and they are misjudged to be speech periods, or that the periods of ambient and transmission noises are also misjudged to be speech periods. Thus, when the true speech period is accompanied by unnecessary signal periods, the same pattern matching as that for the true speech period is carried out also for the unnecessary signal periods; even if the reference template is identical with the pattern of the true speech period, a mismatch arises between them, leading to an error in speech recognition. The mismatch that causes the speech recognition error is commonly referred to as a speech endpoint detection error.

Such a speech endpoint detection error must be avoided by adjusting the unknown input speech pattern for the reasons given below. The reference patterns for registration as reference templates are usually produced by speaker's careful utterances aiming at an optimum recognition rate, or the reference templates themselves are automatically produced as the results of calculation from speech spectral parameters; hence, in most cases the problem of the above-mentioned speech endpoint detection error is excluded from or is not taken into account in the preparation of the reference templates. In contrast thereto, natural voices are mostly used as unknown speech inputs. Therefore, the cause of the endpoint detection error and its situation differ each time. Another reason is that the automatic speech recognizer is required to accurately recognize utterances in any environments.

To avoid a misrecognition or recognition error attributable to the speech endpoint detection error, there has been employed a continuous pattern matching or word spotting scheme. According to such a scheme, a period that is considered to include speech is roughly predetected as the unknown speech period, then edge-free pattern matching is repeated between the speech pattern of that period and the reference template on the assumption that every point in time in the predetected period is the start point of the true input speech, and the smallest one of the distance measures by the pattern matching is used as the result of matching between the two patterns. However, this scheme repeats matching in accordance with the length of the roughly extracted speech period, and hence involves enormous computational complexity.

In a word speech recognizer that is required to be small in the computation scale, the speech endpoint detection processing is simplified to meet the requirement, but as a result, unnecessary speech periods accompany the true speech period before and after it as depicted in FIG. 2, presenting a problem that correct pattern matching is impossible. To solve this problem, it is necessary to employ an algorithm that involves massive amounts of computation.

In Japanese Patent Publication No. 67279/91 there is described a method that performs pattern matching for each of periods extracted using predetermined multiple power threshold values with a view to avoiding an increase in the recognition error rate by errors in the detection of endpoints of the speech period to be recognized. With this method, however, there is a possibility that according to either one or both of the multiple selected power threshold values and the magnitude of the power of input speech, no true speech period can be detected for any power threshold values.

Even if the above-mentioned unnecessary signal periods are eliminated for accurate detection of the true speech period, it is difficult to provide improved performance high enough to stand actual use. One of contributing factor in this problem is utterance variations or fluctuations. For example, when words "kitami" and "ibusuki" (both of which are Japanese city names) are uttered, the vowel /i/ of /ki/ in both words is accompanied by unvoiced consonants /k/ and /t/ or /s/ that are normally uttered weak, and in some cases, the vowel is not clearly uttered under the influence of the unvoiced consonants. This is a well-known phenomenon called "devocalization of vowels or unvoiced vowels." Now, comparing the speech patterns of the words "kitami" and "ibusuki" with the sounds /ki/ clearly uttered and with these sounds unvoiced, respectively, the words are not always correctly recognized according to the pattern matching scheme used or the vocabularies to be recognized at the same time. This is caused by a phenomenon that spectral parameters change due to devocalization of the parts /ki/ or that the unvoiced parts are detected as speech periods at the time of speech endpoint detection.

While in the above the unvoiced vowel is described as an example of utterance variations at the start and end points of speech, variations in the length of a fricative sound in the case of an utterance starting with a sound /s/ or in the length of a nosal sound immediately preceding an utterance starting with /n/ also correspond to utterance variations.

Such an utterance variation at either of the start and end points of speech constitutes a restriction on the pattern matching algorithm that is used to improve recognition performance. With an end edge free matching scheme that fixes the speech start position and sets the end position free or start edge free matching scheme that fixes the speech end position and sets the start position free, it is difficult to prevent a recognition error when an utterance fluctuation or variation occurs near the fixed speech start or end position. Therefore, the use of an edge free matching scheme is indispensable to improving the recognition performance.

However, the recognition error cannot easily be avoided even by the edge free matching scheme. FIG. 3 shows the time-axis correspondence or what is called a time warping function between two patterns in an edge free dynamic programming (DP) matching scheme. The following time-sequence data A and B are a reference template and an unknown speech pattern, respectively.

$A=\{a_1, a_2, \ldots, a_s, \ldots, a_e, \ldots, a_M\}$
$B=\{b_1, b_2, \ldots, b_s, \ldots, b_e, \ldots, b_N\}$ The shaded areas 31 and 32 are speech start and end segments where a vowel becomes unvoiced, an unnecessary nosal sound is added, or some other utterance variations occur at the speech start and end points in the time-sequence data B, exerting influence on the matching. The L-shaped areas 33 and 34 in the start and end segments for pattern matching are free start and end positions in the edge free recognition algorithm, respectively. The broken lines 35 indicate boundaries of a space called a matching window wherein time warping matching is allowed. For the sake of brevity, assume that the time-sequence data A and B have the same period length.

As is evident from the overlapping of the free start and end positions 33 and 34 and the start and end segments 31 and 32 involving utterance variations at the input speech start and end points, the free start and end point positions 33 and 34 are mostly affected by the utterance variations. Thus, if matching is performed on the basis of simply determined start and end positions, it is affected by an utterance variation at the speech start or end point unless a time warping function is obtained which allows such an extreme or excessive time-axis correspondence (time warping) between the unknown speech pattern and the reference template as indicated by the solid line 36 in FIG. 3. On the other hand, since the matching of the two patterns is carried out on the one-to-one correspondence basis at the middle thereof not so much affected by the utterance variation, the time warping function needs to draw locus that permit an extreme time-axis correspondence at the speech start and end points alone as indicated by the solid lines 37. However, according to the slope constraint function used, the time warping function sometimes cannot provide such an extreme time-axis correspondence as indicated by the solid lines 37, in which case a different time warping function is chosen which satisfies the slope constraint function. In this instance, the normalized distance measure obtained on the time warping function is larger than that obtainable by the matching for only the speech period with no utterance variation involved—this is likely to cause an recognition error.

In U.S. Pat. No. 5,222,190 there is described a continuous speech recognition method which registers preselected words of a high frequency of use as anchor words to identify the boundary between speech patterns and detects the boundary between such an anchor word and a non-anchor word appearing in speech, by which the start and end points of the non-anchor word can accurately be determined. However, even if the start and end points of the word to be recognized are determined accurately, recognition errors by utterance variations cannot always be prevented for the reasons given above.

SUMMARY OF THE INVENTION

It is therefore an object of the present invention to provide a word speech recognition method and apparatus which permit implementation of word speech recognition of improved recognition rate by a simple algorithm with a small amount of computation even if input speech is accompanied by unnecessary signal periods before and after it.

Another object of the present invention is to provide a word speech recognition method and apparatus which reduce recognition errors caused by speech or utterance variations at the speech start and end points of the unknown speech pattern.

A word speech recognition method according to a first aspect of the present invention comprises the steps of:

(a) analyzing an unknown input digital speech signal for each frame and extracting therefrom a sequence of spectral parameters;

(b) detecting start and end points of the speech period of the input digital speech signal and obtaining the sequence of spectral parameters of the input digital speech signal for the speech period as the unknown speech pattern;

(c) selecting one of the multiple reference templates;

(d) calculating a difference d between the period length of the unknown speech pattern and the period length of the selected reference template;

(e) comparing said difference d with a predetermined threshold length $\epsilon_1$, where $\epsilon_1$ is a positive value;

(e-1) when said difference d exceeds the threshold length $\epsilon_1$, extracting from the unknown speech pattern its partial patterns of about the same length as the period length of the selected reference template, each starting at a different position in the unknown speech pattern; and (e-2) performing pattern matching between the partial patterns and the selected reference template to detect the distances between them;

(f) determining the smallest one of the detected distances to be the distance between the unknown speech pattern and the selected reference template; and (g) repeating the steps (c) to (f) for each of the multiple reference templates and outputting, as the result of recognition of the input digital speech signal, the label name of the reference template which provides the smallest one of the distances between the unknown speech pattern and all of the reference templates.

An automatic speech recognizer for implementing the word speech recognition method according to the first aspect of the present invention comprises:

input means for inputting a digital speech signal;

speech spectral parameter extracting means for analyzing the digital speech signal for each frame and for extracting therefrom a sequence of speech spectral parameters;

speech endpoint detecting means for detecting speech endpoints of the speech period of the digital speech signal on the basis of the sequence of speech spectral parameters outputted from the speech spectral parameter extracting means;

unknown speech pattern register means for determining start and end points of the speech period of the unknown speech pattern on the basis of said detected speech endpoints and for storing a sequence of spectral parameters of the speech period as the unknown speech pattern;

reference template storage means for prestoring multiple reference templates for speech recognition;

period length comparing means for comparing the speech period length of each of the stored multiple reference templates and the speech period length of the unknown speech pattern stored in said unknown speech pattern register means;

input pattern extracting means for extracting partial patterns from the unknown speech pattern stored in the unknown speech pattern register means, each starting at a different position, on the basis of the comparison result from the period length comparing means and the output result from the unknown speech pattern register means;

pattern matching means for performing pattern matching between each of the multiple partial patterns and the each reference template and for outputting multiple distance measures calculated between them;

distance comparing means for comparing the multiple distance measures from the pattern matching and for outputting the smallest distance measure as the distance measure between the unknown speech pattern and said each reference template; and result output means for outputting the label name of the reference template which provides the distance measure decided to be the smallest among those between all of the multiple reference templates and the unknown speech pattern.

A word speech recognition method according to a second aspect comprises the steps of:

(a) analyzing an unknown input digital speech signal for each frame and for extracting therefrom a sequence of spectral parameters;

(b) detecting start and end points of the speech period of the input digital speech signal and obtaining the sequence of spectral parameters of the input digital speech signal for the speech period as the unknown speech pattern;

(c) selecting one of the multiple reference templates;

(d) performing pattern matching between the unknown speech pattern and the selected reference template over their entire lengths to obtain a first distance between them;

(e) extracting a reference template partial period from the selected template, except its start and end segments;

(f) extracting a speech pattern partial period from the unknown speech pattern, except its start and end segments;

(g) performing pattern matching between the reference template partial period and the speech pattern partial period to obtain a second distance between the unknown speech pattern and the selected reference template;

(h) comparing the first and second distances and deciding the smaller one of them to be the distance between the unknown speech pattern and the selected reference template; and (i) repeating the steps (c) to (h) for each of the multiple reference templates and outputting, as the result of recognition of the input digital speech signal, the label name of the reference template which provides the smallest one of the distances between the unknown speech pattern and all of the multiple reference templates.

An automatic speech recognizer for implementing the word speech recognition method according to the second aspect of the present invention comprises:

input means for inputting a digital speech signal;

speech spectral parameter extracting means for analyzing the digital speech signal for each frame and for extracting therefrom sequence of speech spectral parameters;

speech period detecting means for detecting the speech period of the unknown speech pattern as a first speech period on the basis of the sequence of speech spectral parameters outputted from the speech spectral parameter extracting means and for determining both ends of the first speech period as first speech endpoints;

unknown speech pattern register means for storing a sequence of spectral parameters of the first speech period as the unknown speech pattern;

unknown pattern partial period determining means for determining second speech endpoints that define a second speech period, by eliminating start and end segments from the first speech period detected by the speech period detecting means;

reference template storage means for prestoring multiple reference templates for speech recognition, together with information about first speech endpoints defining their speech periods as first speech periods;

reference template partial period determining means for determining second endpoints that define a second speech period, by eliminating start and end segments from the first speech period of each of the multiple reference templates selected from the reference template storage means;

switching means for selecting the first and second endpoints of the unknown speech pattern and said each selected reference pattern from the speech period detecting means and the reference template pattern storage means, thereby selecting the first and second speech periods of the unknown speech pattern from the unknown pattern register means and said each selected reference template from the reference template storage means;

pattern matching means for performing pattern matching between the first speech periods of the unknown speech pattern and said each selected reference template selected by the switching means to obtain a first distance and for performing pattern matching between the second speech periods of the unknown speech pattern and said each selected reference template selected by the switching means to obtain a second distance;

distance comparing means for comparing the first and second distances to determine the smaller one of them to be the distance measure between the unknown speech pattern and said each selected reference template; and result output means for comparing all the distance measures outputted from the distance comparing means as the results of matching of the unknown speech pattern with the multiple reference templates, for determining that one of the multiple reference templates which is decided to provide the smallest distance measure, and for outputting the label name of the determined reference template.

BRIEF DESCRIPTION OF THE DRAWINGS

FIG. 13 is a flowchart showing the pattern matching procedure in the speech recognition method according to the second aspect of the present invention.

DESCRIPTION OF THE PREFERRED EMBODIMENTS

FIRST EMBODIMENT

Prior to the description of the principle of the word speech recognition method according to the first aspect of the present invention, a brief description will be given again of the fact that the true speech period is accompanied by the unnecessary signal period.

(1) The true speech period is either preceded or followed or both preceded and followed by the unnecessary signal period.

(2) Even if a noise is superimposed on the true speech period, it does not severely affect the speech endpoint detection, and this problem can be solved by an analysis for removing the noise component or by pattern matching.

(3) When a speaker causes an automatic speech recognizer to accurately recognize his speech, it can be expected that the speaker favorably utters so that the input speech becomes speech appreciably similar to the reference template desired to be recognized. That is, the period length of the input speech becomes about the same as the period length of the reference template desired to be recognized.

In view of the above phenomena (1) to (3), when it is judged from the period length of the detected speech period that the true speech period is accompanied by the unnecessary signal period, a start and/or end segments, except the period corresponding to the period length of the reference template over which pattern matching is to be performed, are eliminated from the detected speech period, and pattern matching is performed between the remaining speech period and the reference template, by which it is possible to provide recognition results of increased accuracy and free from the unnecessary speech periods. Further, by computing candidates for the speech start and end points in the detected speech period through utilization of information used for spectral parameters, the true speech period can be estimated even if it is preceded and followed by unnecessary speech periods—this leads to improvement of recognition performance.

Figure 4:
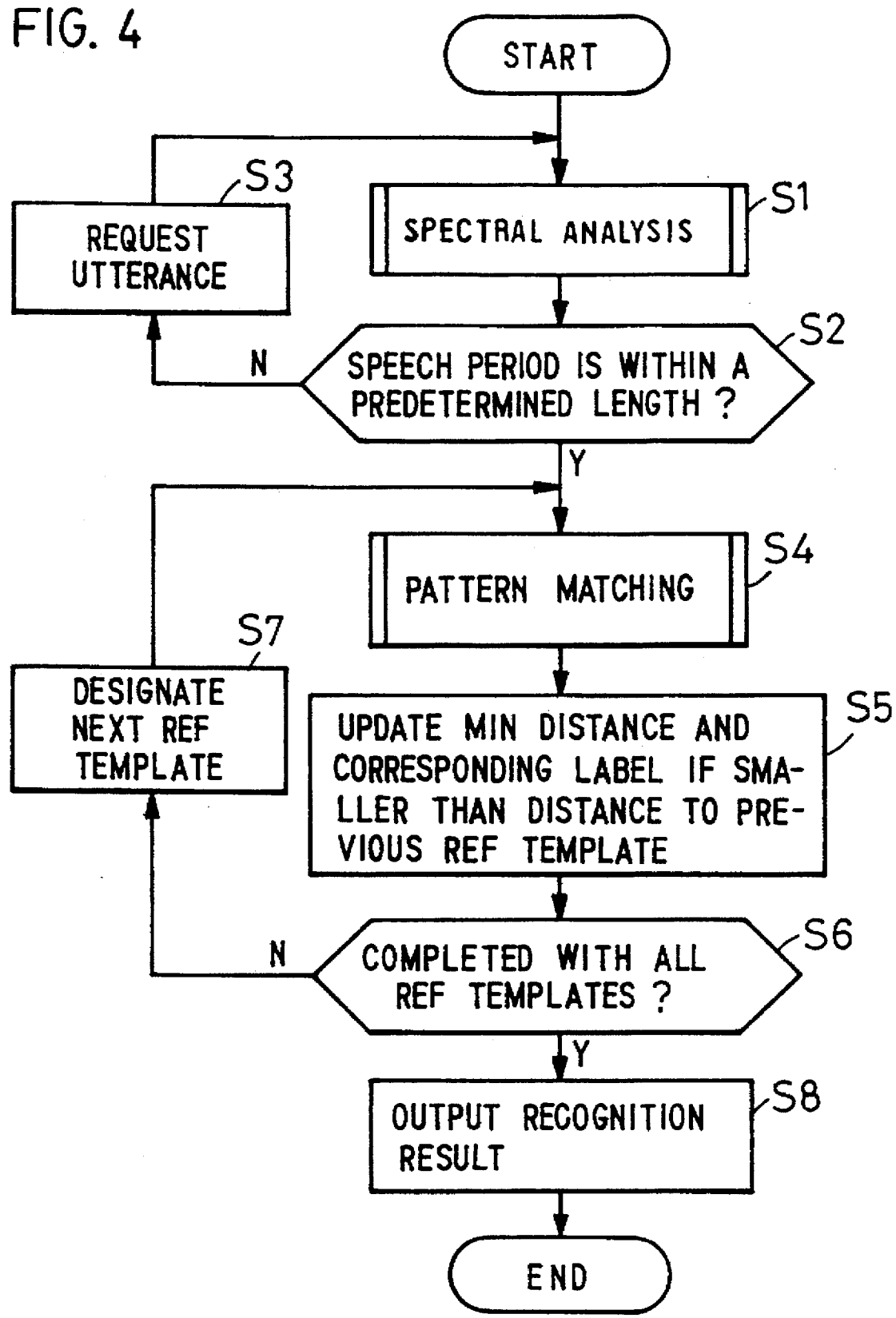
FIG. 4 is a flowchart illustrating the outline of the speech recognition procedure according to the present invention.

FIG. 4 is a flowchart showing the outline of the speech recognition procedure that employs the speech recognition method of the present invention.

In step S1 an input speech signal of a word uttered by a speaker is subjected to a spectacle analysis, by which a sequence of speech spectral parameters is obtained and the speech period to be recognized is determined. In step S2 it is checked whether the extracted speech period has start and end points and whether the speech period is within a predetermined length. If the speech period is longer than the predetermined length, then it is judged that the entire speech period cannot be stored in a buffer, and in step S3 a request is made to the speaker for further utterance and the procedure returns to step S1. If the extracted speech period is within the predetermined length, then the spectral parameter sequence of that period is defined as an unknown speech pattern, and in step S4 a selected current reference template and the input speech pattern are matched with each other by this invention method described later, by which the distance between the patterns is calculated. In step S5, if the distance of the input speech pattern relative to the current reference template is smaller than the minimum distance detected so far (the initial value being set at infinity, for example), the smallest-ever distance measure and the label of the reference template corresponding thereto are updated with the current distance measure and the label of the current reference template. This is followed by step S6, wherein a check is made to see if the input speech pattern has been matched with all the reference templates; if not, the next reference template is designated in step S7 and the pattern matching in step S4 and the updating in step S5 are repeated. Upon completion of the matching of the input speech pattern with all the reference templates, the procedure goes to step S8, wherein the label of the reference template corresponding to the smallest distance measure is outputted as the result of recognition of the input speech.

Figure 5:
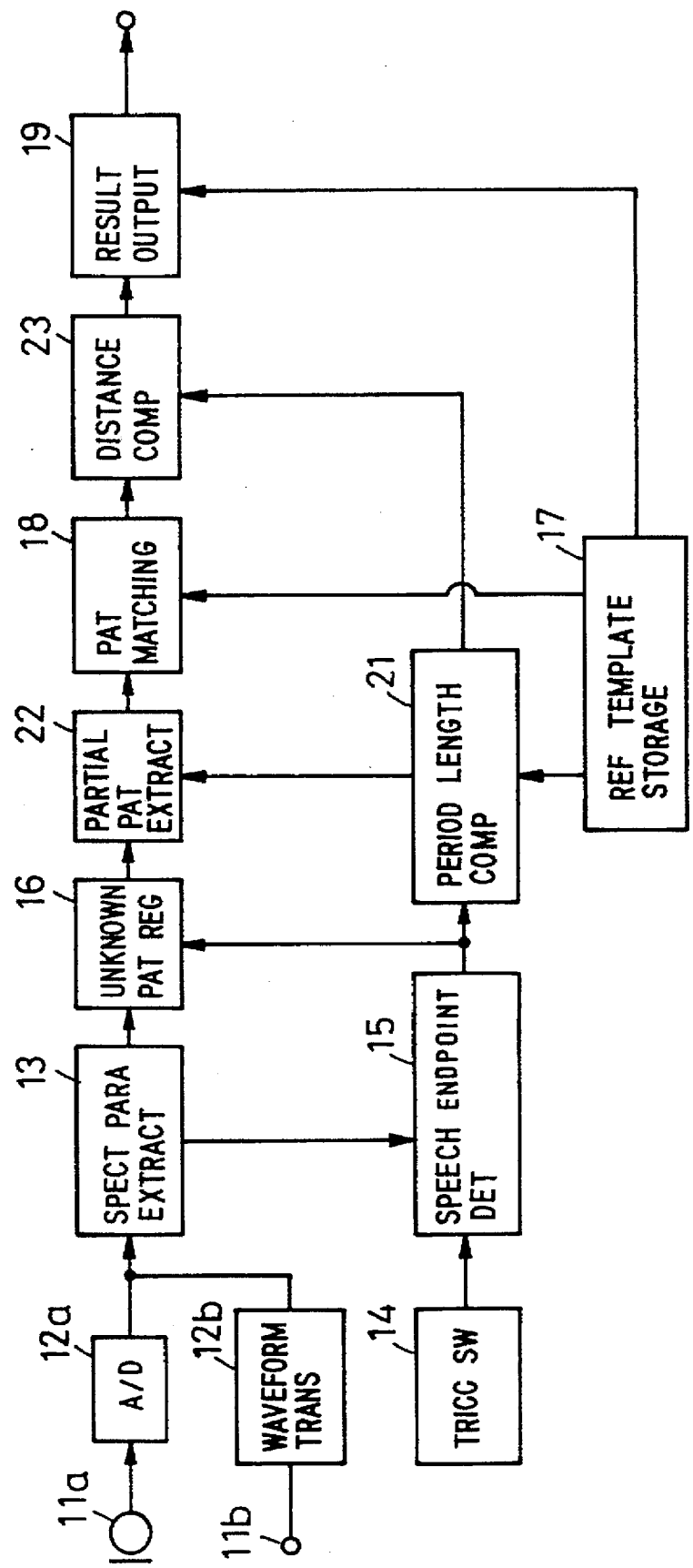
FIG. 5 is a block diagram illustrating the automatic speech recognizer according to the first aspect of the present invention.

Turning now to FIG. 5, an embodiment of the word speech recognizer according to the first aspect of the present invention will be described.

In FIG. 5, the speech input part 11a is, for example, a microphone that transduces input speech uttered by a speaker to a speech signal. The analog-to-digital (A/D) converting part 12a samples a speech signal waveform at a fixed sampling rate for conversion into a digital signal waveform, which is provided to the spectral parameter extracting part 13. The word speech recognizer of the present invention is applicable not only to the recognition of the analog speech signal directly inputted by the speaker as described above but also to the recognition of a digital speech signal received at a terminal 11b via a digital circuit (not shown) on the basis of ITU-T Recommendation G.711, for instance. In the case of receiving at the terminal 11b a digital speech signal subjected to information compression (such as nonlinear compression of the speech waveform on the basis of ITU-T Recommendation G.711, G721 or G722, for instance) when it was converted from the input speech at the sending side for transmission of the speech signal over the digital circuit, the digital speech signal is inversely transformed or its sampling rate is converted in a waveform transforming part 12b, thereafter being sent to the spectral parameter extracting part 13.

The spectral parameter extracting part 13 analyzes the inputted signal speech signal for each frame and extracts spectral parameters. This analysis can be done by a scheme such as a short-time power analysis, auto correlation function processing, PARCOR analysis, LPC analysis (Linear Prediction analysis) or LPC cepstrum analysis. A sequence of spectral parameters is obtained by this analysis. The trigger switch 14 triggers the start point detection in the speech endpoint detection on the occasion of word speech recognition. The speech endpoint detecting part 15 determines one speech start point and one speech end point from the sequence of spectral parameters available from the spectral parameter extracting part 13. This can be done by, for example, a scheme that premeasures the mean noise power level prior to the utterance of speech and defines, as the speech period, a period during which the short-time power value of the power waveform obtained by the analysis of the input speech signal remains larger than the premeasured mean noise power level in excess of a fixed threshold value for more than a predetermined period of time. In the case where two speech periods during which the short-time power value exceeds the fixed threshold value are present adjacent each other across a short speech period during which the short-time power value is smaller than the fixed threshold value (for example, in the case of the utterance of a word which contains a voiceless or silent period, such as /sapporo/), these three speech periods are detected as a single speech period.

The unknown speech pattern register 16 stores, as an unknown speech pattern, the spectral parameters from the speech start to end point determined in the speech endpoint detecting part 15.

Figure 6:
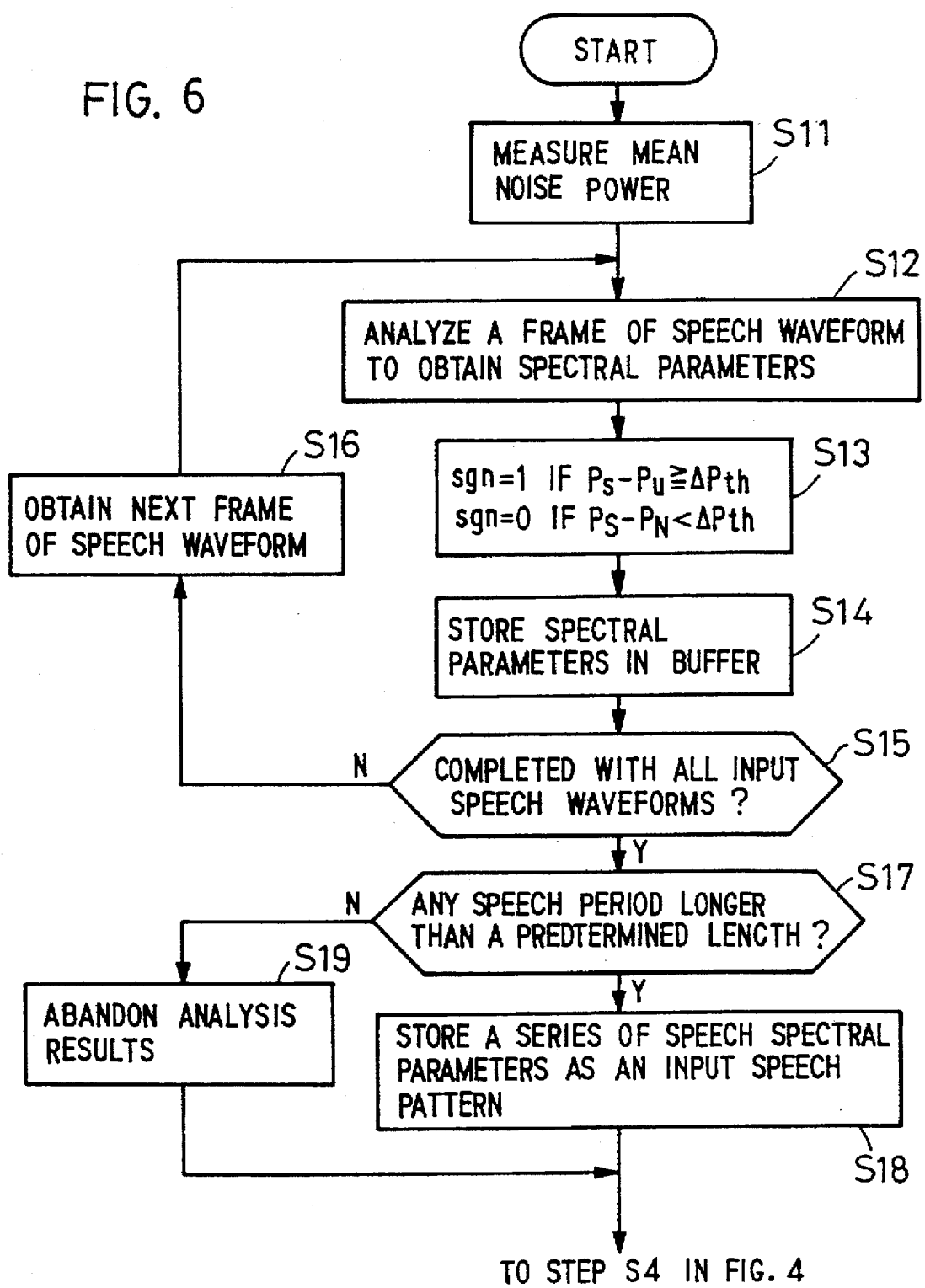
FIG. 6 is a flowchart showing a speech analysis procedure in the speech recognition procedure of FIG. 4.

FIG. 6 is a flowchart showing the speech analysis procedure mainly in step S1 in FIG. 4 which is executed by the spectral parameter extracting part 13, the speech endpoint detecting part 15 and the unknown speech pattern register 16. In step 11, the spectral parameter extracting part 13 measures a short-time mean power $P_N$ of all noises including environmental noises prior to a speech utterance by the speaker. Next, in step S12 the spectral parameter extracting part 13 analyzes one frame of the waveform of the speech uttered by the speaker to obtain spectral parameters of that frame. By this analysis, the short-time power of the speech signal, which is a 0-th order auto correlation value of the signal, is also obtained. In step S13 the speech endpoint detecting part 15 compares the value of the short-time power (expressed by a log power) $P_S$ (see FIG. 7), obtained in the above-mentioned spectral parameter extraction, with the noise power $P_N$. If the former is larger than the latter in excess of a predetermined threshold value $\Delta P_{th}$, that is, if $P_S - P_N \geq \Delta P_{th}$, a sign is set to sgn=0 and if not, sgn=1. Then, in step S14 the set of spectral parameters of that frame and the sign sgn are written into a work buffer (not shown) in the spectral parameter extracting part 13 at the position corresponding to that frame, after which the procedure proceeds to step S15. In step S15 a check is made to see if the analysis of all the frames of the input speech waveform has been completed; if not, the next frame of the speech waveform is obtained in step S16 and then the procedure goes back to step S12, wherein the above-mentioned processing is repeated.

Figure 7:
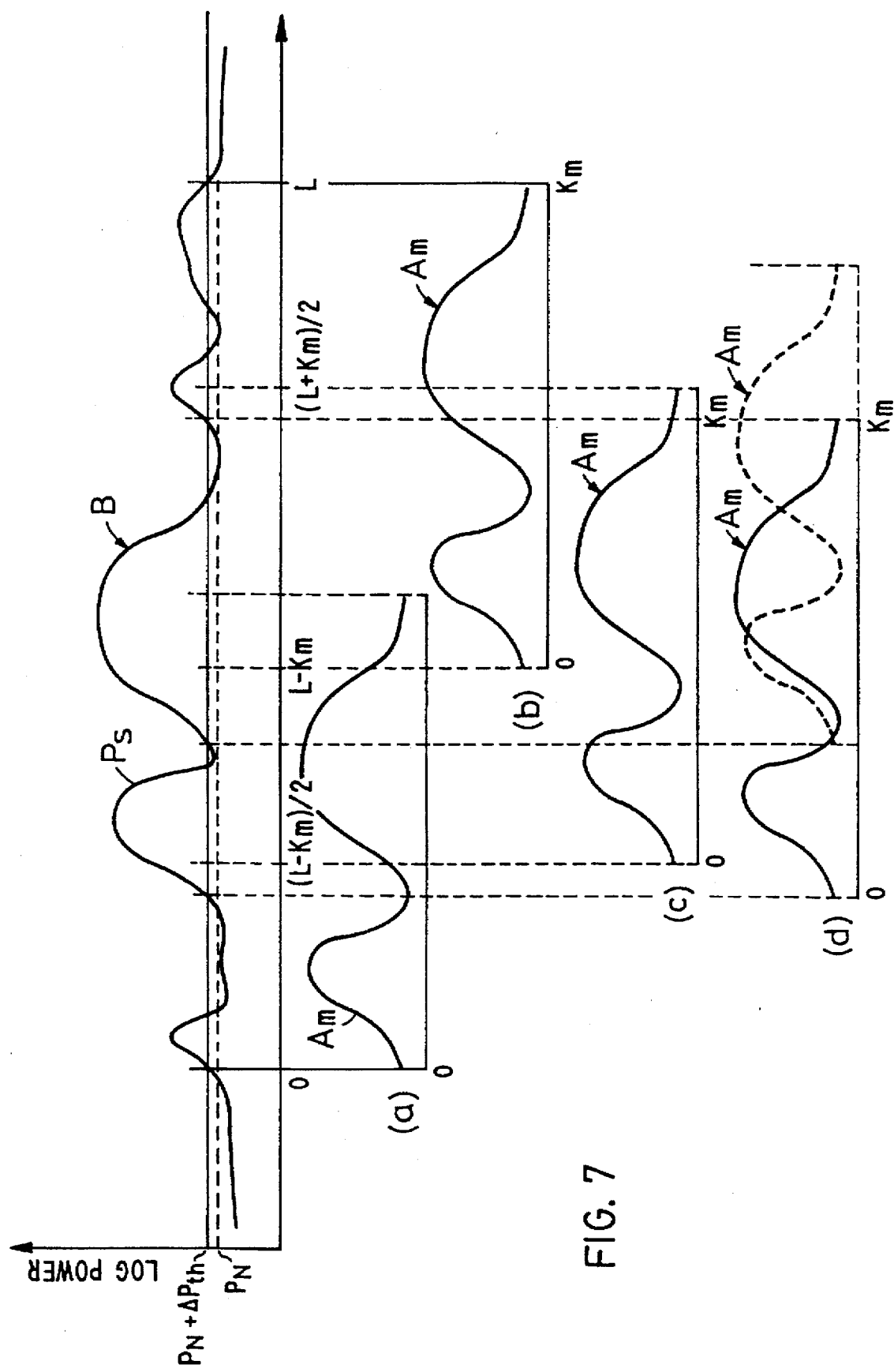
FIG. 7 is a speech power waveform diagram showing how to extract a partial pattern from an input speech pattern through the use of reference templates.

If it is found in step S15 that all the frames of the speech waveform have been analyzed, the procedure proceeds to step S17, wherein a series of signs sgn in the work buffer in the spectral parameter extracting part 13 are checked; if there exists only one period during which the sign sgn=0 lasts for longer than a fixed period length, the start and end points of that period are decided to be the speech endpoints. In the case where there exist multiple periods with sgn=1 separated by a short period with sgn=0, they are decided to be one speech period that starts at the position of the first sgn=1 and ends at the position of the last sgn=1. In this way, the speech endpoints and the speech period length L, which is defined by them, are obtained as depicted in FIG. 7. Moreover, it is checked in step S17 whether the speech period length L is larger than a predetermined value $L_D$; if $L \geq L_D$, a sequence of spectral parameters of that speech period is stored as an input speech pattern $B_S$ in the unknown speech pattern register 16 in step S18, followed by step S4 in FIG. 4. When the speech period L is shorter than $L_D$ in step S17, the procedure discards or abandons all analysis results in step S19 and proceeds to step S4 in FIG. 4.

In the first embodiment of the present invention, a period length comparing part 21 compares the speech period length L of an unknown speech pattern B available from the speech endpoint detecting part 15 and the speech period length Km of a reference template Am selectively read out of the reference template storage part 17. When the length difference d=L-Km is larger than a positive threshold value $\epsilon_1$, the period length comparing part 21 instructs a partial pattern extracting part 22 to extract partial patterns of about the same length Km as that of the reference template Am from the unknown speech pattern B at multiple positions, at least its start and end positions. When the difference d is $-\epsilon_2 \leq d \leq \epsilon_1$, the partial pattern extracting part 22 passes the unknown speech pattern intact to the pattern matching part 18. The values $\epsilon_1$ and $\epsilon_2$ are determined in accordance with the allowable time warping range in pattern matching.

The partial pattern extracting part 22 responds to the instruction from the period length comparing part 21 to extract the partial patterns at the designated positions or the entire period of the speech pattern. In the reference template storage part 17 there are prestored, as reference templates each identified by a label name, spectral parameter sequences obtained by analyzing multiple word speech patterns for speech recognition use, following the same procedure as in the spectral parameter extracting part 13, the speech period detecting part 15 and the unknown speech pattern register 16 (steps S11 to S18 in FIG. 6).

Now, let the number of reference templates be represented by M and the reference templates by Am (where m=1, 2, 3, ..., M). The pattern matching part 18 executes matching between multiple partial patterns extracted from the unknown speech pattern B stored in the unknown speech pattern register 16 and each reference template Am stored in the reference template storage part 17 and outputs distance measures between the unknown speech pattern or partial patterns and the reference templates. This matching can be done by, for example, a DTW matching scheme well-known as a pattern matching scheme for speech recognition. When $d > \epsilon_1$, at least two partial patterns of lengths Km extracted from the unknown speech pattern B at its start and end positions, respectively, are provided to the pattern matching part 18, which matches them with each reference template Am to obtain the distances between them. A distance comparing part 23 detects the smallest one of the distances between the multiple partial patterns and the reference template and sets the smallest distance as the matching distance between the unknown speech pattern B and the reference template Am. When $-\epsilon_2 \leq d \leq \epsilon_1$, the pattern matching part 18 executes pattern matching between the entire period of the unknown speech pattern B and the reference template Am to obtain the distance between them. In this way, the distances between the unknown speech pattern B and all the reference templates are detected and provided to the result output part 19, which decides the reference template Am having provided the smallest distance and sends the label name m of that reference template Am to a host computer that governs the operation of the automatic speech recognizer.

Figure 8:
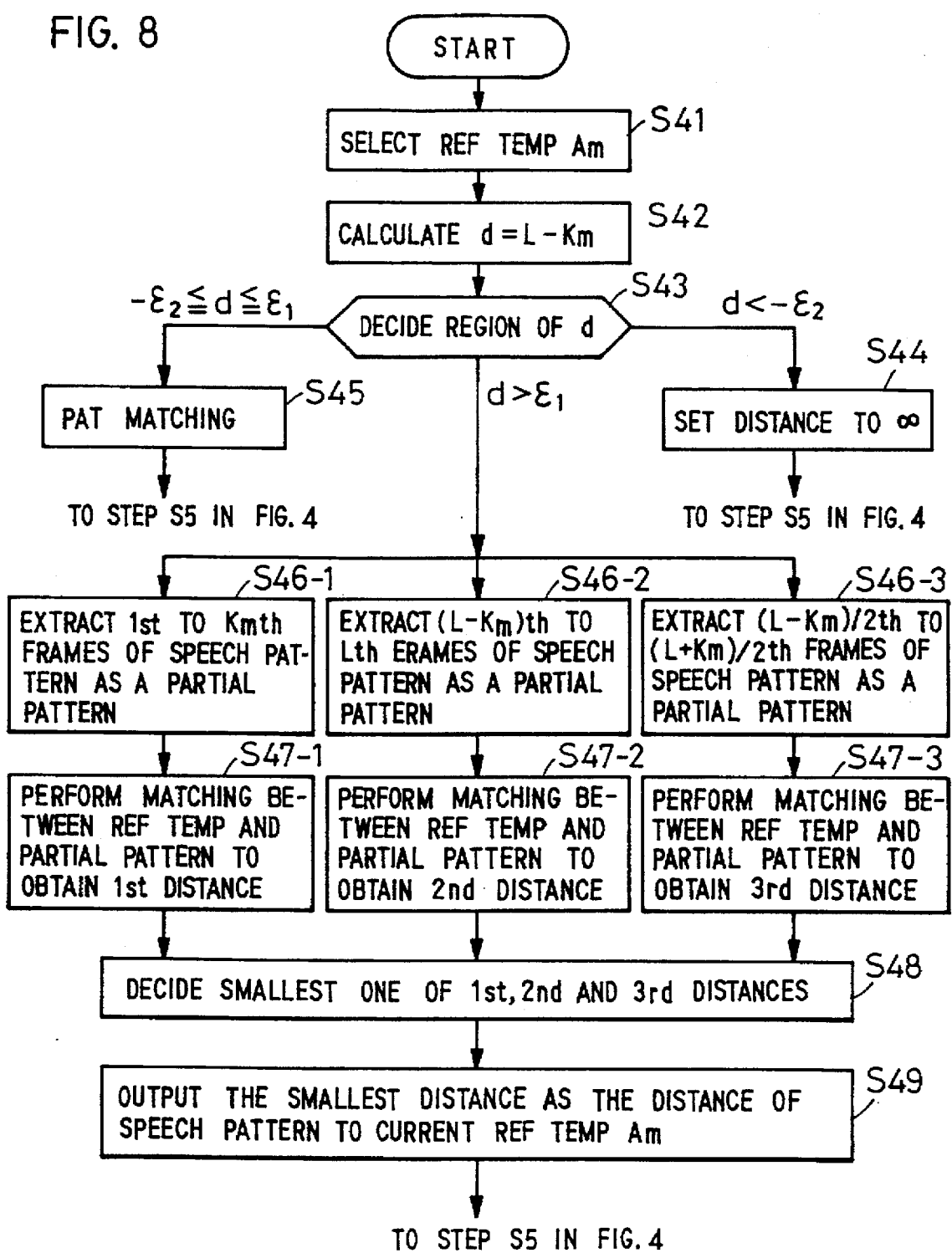
FIG. 8 is a flowchart showing an example of the pattern matching procedure in the speech recognition method according to the first aspect of the present invention.

FIG. 8 shows the matching procedure by the reference template storage part 17, the pattern matching part 18, the period length comparing part 21, the partial pattern extracting part 22, the distance comparing part 23, the result output part 19 and the period length comparing part 21.

The matching procedure begins with step S41, wherein an m-th reference template Am is selected from the reference template storage part 17 and provided to the period length comparing part 21. Letting the period length of the unknown speech pattern B be represented by L and the period length of the m-th reference template Am by Km (where m=1, 2, . . . , M), the period length comparing part 21 calculates the difference $d=L-Km$ between the period lengths L and Km of the unknown speech pattern B and the reference template AM in step S42. In step S43 a check is made to see if the difference d is larger or smaller than the predetermined positive threshold values $\epsilon_1$ and $\epsilon_2$, that is, it is checked whether $d<-\epsilon_2$ (i.e. L is shorter than $Km-\epsilon_2$), $-\epsilon_2 \leq d \leq \epsilon_1$, or $d>\epsilon_1$. The threshold values $\epsilon_1$ and $\epsilon_2$ are determined in accordance with the allowable time warping range of pattern in pattern matching, for instance. If $d<-\epsilon_2$, the speech pattern B is decided to fall outside the allowable time warping range and hence cannot be recognized, and in step S44 the distance between the both patterns is set to, for example, infinity and then the procedure returns to step S5 in FIG. 4. When $-\epsilon_2 \leq d \leq \epsilon_1$ in step S43, the speech pattern B is provided intact to the pattern matching part 18 in step S45, which performs matching between the speech pattern B and the current reference template Am as in the prior art thereby to obtain the distance between them, then the procedure returns to step S5 in FIG. 4. Alternatively, the distance may be obtained by executing the matching by a method of a second embodiment of the present invention. When it is decided in step S43 that $d>\epsilon_1$, that is, when it is decided that the period length L of the unknown speech pattern B is apparently longer than the period length Km of the reference template Am, the partial pattern extracting part 22 extracts multiple partial periods from the detected unknown speech pattern and sequentially sends them as partial patterns to the pattern matching part 18.

As shown in FIG. 7, there are four ways of determining the position of a partial pattern of the unknown speech pattern B to be matched with the reference template Am and performing pattern matching between them.

(a) A partial pattern is extracted from the unknown speech pattern B with its start point and that of the reference template Am set at the same position and the end point of the reference template set at a Km-th frame, and end edge free matching is carried out between the reference template and the thus extracted segment of the unknown speech pattern B.

(b) A partial pattern is extracted from the unknown speech pattern B with its end point and that of the reference template Am set at the same position and the start point of the reference template set at an (L−Km)th frame, and start edge free matching is carried out between the reference template and the thus extracted segment of the unknown speech pattern B.

(c) A partial pattern is extracted with its start and end positions set at an (L−Km)/2 and (L+Km)/2 frames, respectively, then the reference template Am is positioned in substantially the center of the unknown speech pattern, and edge free matching is carried out between the reference template and the thus extracted segment of the unknown speech pattern B.

(d) A partial pattern is extracted which starts at each position (frame) where the short-time power $P_S$ of the unknown speech pattern B increases from a low level and becomes higher than the noise level $P_N$ measured in the non-speech period in excess of a fixed value $\Delta P_{th}$, for example, at each position where the power $P_S$ of the speech pattern B rises up from a low level with an inclination larger than a fixed value and exceeds the level $P_N + \Delta p_{th}$ as shown in FIG. 7; this partial pattern ends at a position the length Km away from the start position within the range of the length (the number of frames) L. Edge free matching is carried out between the reference template and the thus extracted segment of the unknown speech pattern B.

In the present invention, any of the following combinations of the four modes can be used.
  (1) To carry out modes (a) and (b).
  (2) To carry out modes (a), (b) and (c).
  (3) To carry out mode (d).

The embodiment of FIG. 8 corresponds to the combination (2). In step S46-1 a partial period or segment of the unknown speech pattern from its start point (first frame) to the Km-th frame is extracted as a partial pattern, which is provided to the pattern matching part 18, and in step S47-1 pattern matching is performed between the reference template Am and the extracted partial pattern or pattern segment to obtain a first inter-pattern distance. In step S46-2 a partial period or segment of the unknown speech pattern from its start point to the Km-th frame (i.e. (L−Km)th frame from the start point) is extracted as a partial pattern or pattern segment, and in step S47-2 pattern matching is carried out between the extracted partial pattern and the reference template Am to obtain a second inter-pattern distance. In step S46-3 a partial period or segment of the unknown speech pattern from its (L−Km)/2-th to (L+Km)/2-th frames is extracted as a partial pattern or pattern segment, and in step S47-3 the extracted pattern is subjected to pattern matching with the reference template Am to obtain a third inter-pattern distance. Finally, in step S48 the smallest one of the first to third distances is decided by the distance comparing part 12, then in step S49 that distance is decided as the distance between the unknown speech pattern B and the reference template Am, and the procedure returns to step S5 in FIG. 4.

While in the pattern matching procedure of FIG. 8 steps S46-1, S47-1, S46-2, S47-2, S46-3, S47-3, S48 and S49 have been described to be executed in the case of employing the combination of the pattern matching modes (a), (b) and (c), pattern matching may also be performed using the combination (1) of the modes (a) and (b) which omits steps S46-3 and S47-3.

Figure 9:
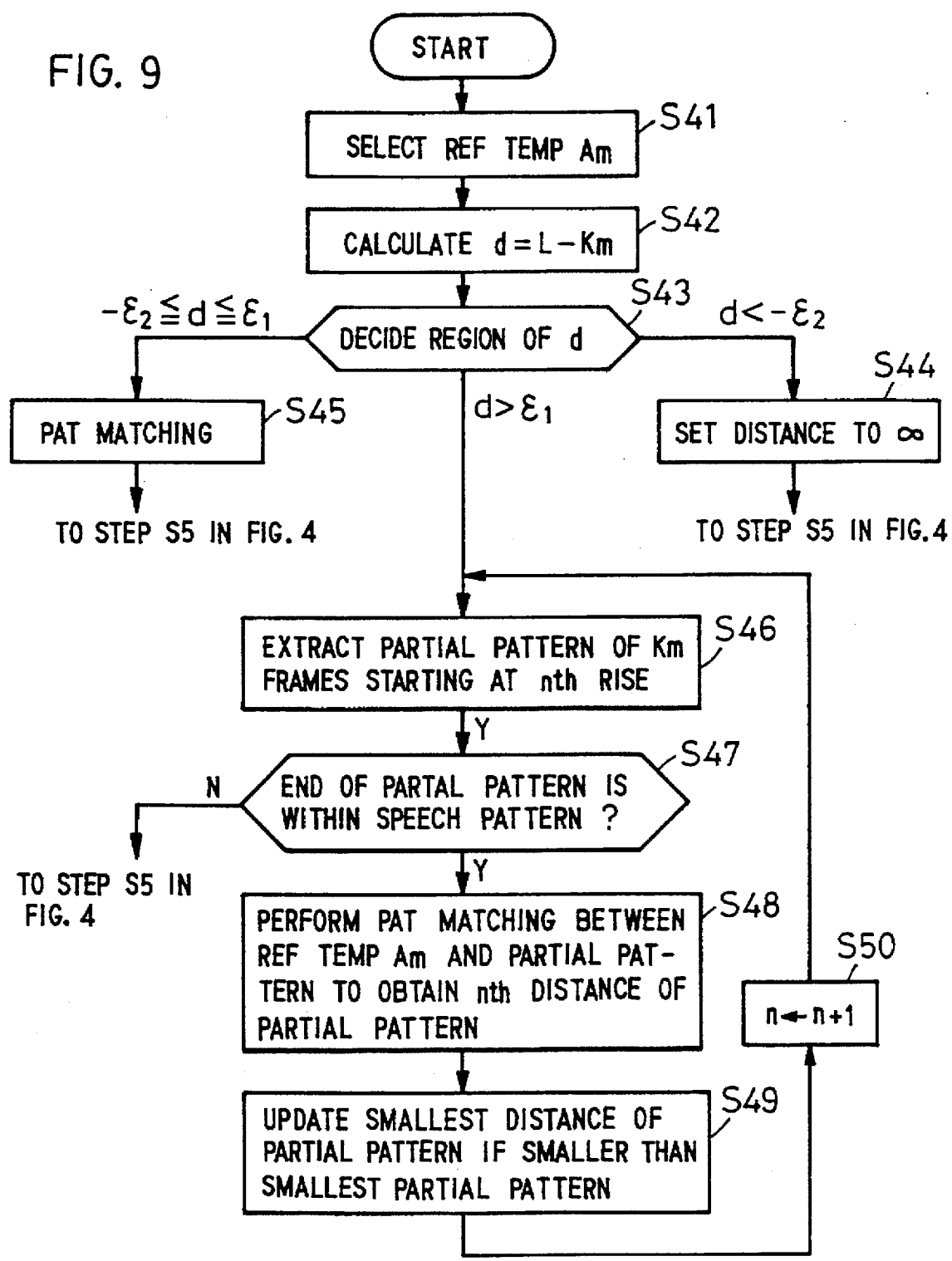
FIG. 9 is a flowchart showing another example of the pattern matching procedure in the speech recognition method according to the first aspect of the present invention.

FIG. 9 shows the pattern matching procedure in the case of using the mode (d) alone. In FIG. 9 steps S41 to S45 are the same as those in FIG. 8. In step S46 a partial period of the unknown speech pattern, which is Km frame long from an n-th rise-up position of the power of the speech pattern where it exceeds the predetermined value $P_N + \Delta P_{th}$ in the speech period shown in FIG. 7, is extracted as a partial pattern. Then, in step S47 a check is made to see if the end point of the extracted partial pattern lies within the unknown speech pattern; if so, the procedure proceeds to step S48, wherein pattern matching is carried out between the current reference template and the extracted n-th partial pattern to obtain the distance therebetween as a partial pattern distance. If it is found in step S49 that the partial pattern distance is smaller than the smallest partial pattern distance so far, the latter is updated with the former, and in step S50 n is incremented by one, after which the procedure goes back to step S46. If it is detected in step S47 that the end point of the extracted partial pattern is outside the speech pattern, the smallest partial pattern distance available at that time is decided to be the distance measure of the current reference template with respect to the unknown speech pattern B, then the procedure returns to step S5 in FIG. 4.

The pattern matching in FIG. 8 or 9, including steps S5, S6 and S7 in FIG. 4, is carried out for all the reference templates, and in this while the smallest distance and the label of the reference template corresponding thereto are updated with the current ones, with the result that the label of the reference template is determined which has provided the smallest distance with respect to the unknown speech pattern. The label thus determined is provided, as the result of recognition of the input speech, to the host computer, for instance.

While in the above the partial pattern to be extracted has been described to be equal to the length Km of the current reference template Am, the period length of the partial pattern may be arbitrarily chosen such that it falls in the range from the start to end positions of the detected input speech period length and within ±Wm/2 the range in which time warping is allowable in the matching algorithm of the pattern matching part 18. Further, the threshold values $\epsilon_1$ and $\epsilon_2$ may also be equal to each other in the above.

SECOND EMBODIMENT

In the first embodiment, multiple partial patterns are extracted from the unknown speech pattern at different positions thereof and the smallest one of the inter-pattern distances obtained by matching between the partial patterns and each reference template is selected—this is equivalent to pattern matching for the partial period of the speech pattern of the word speech to be recognized with unnecessary start and end segments eliminated therefrom. Accordingly, a bad influence of unnecessary sounds on the recognition rate is lessened. In practice, however, even when the input word speech is not preceded nor followed by unnecessary sounds, utterance variations at the start and endpoints of the word speech adversely affect the recognition rate. Now, a description will be given of an embodiment according to the second embodiment of the present invention which is aimed at solving this problem.

Figure 10:
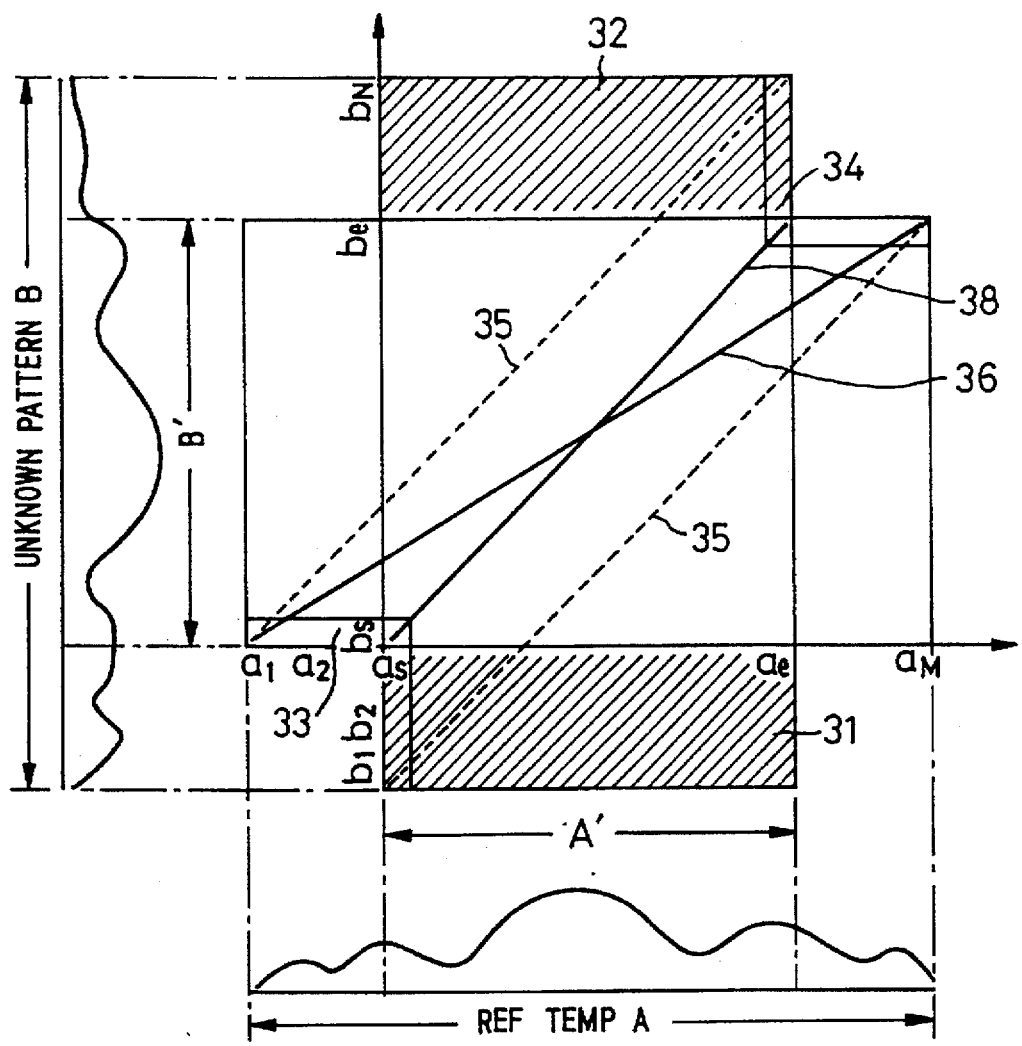
FIG. 10 is a diagram showing a time warping function when a pattern matching operation was conducted by DP matching in the method according to the second aspect of the present invention.

FIG. 10 is a conceptual diagram of a matching algorithm according to the second aspect of the invention in which speech start and end segments are eliminated from the matching range. As referred to previously, in the matching of a speech pattern that contains utterance variations in its start and end segments which appear as variations in the spectral parameters of speech, it is difficult to exclude the influence of the utterance fluctuations for accurate matching. However, more accurate matching results could be obtained by preeliminating from the detected speech period the start and end segments where utterance variations are likely to exist.

Figure 1:
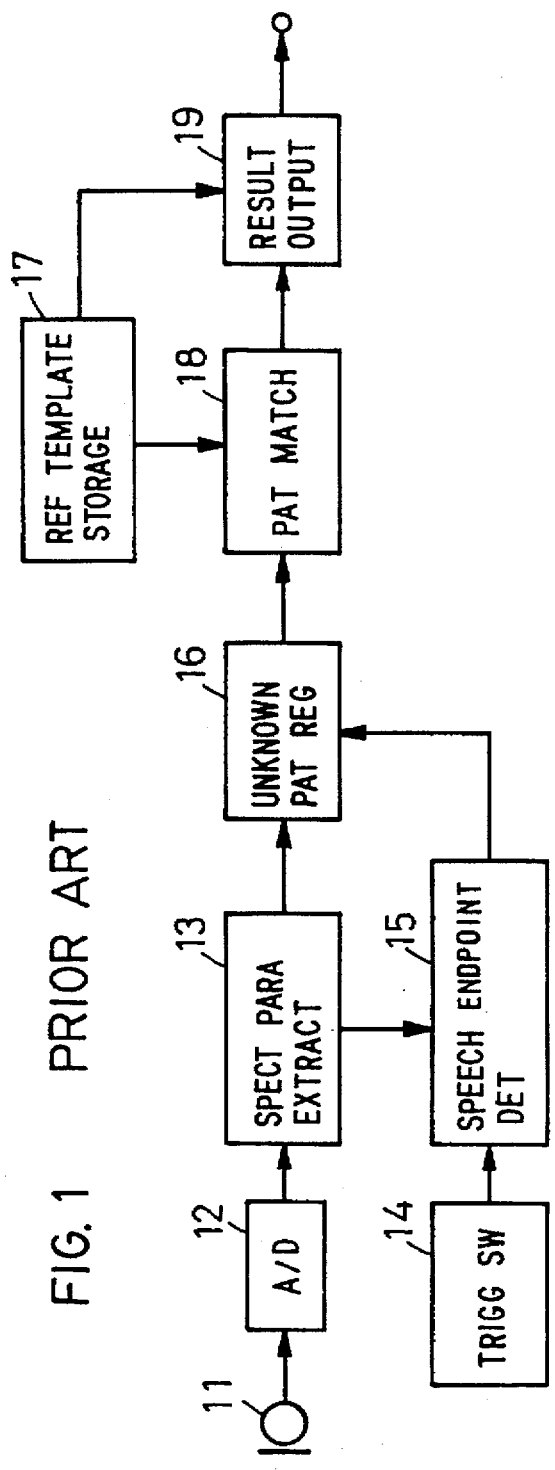
FIG. 1 is a block diagram for explaining a conventional automatic speech recognizer.
Figure 2:
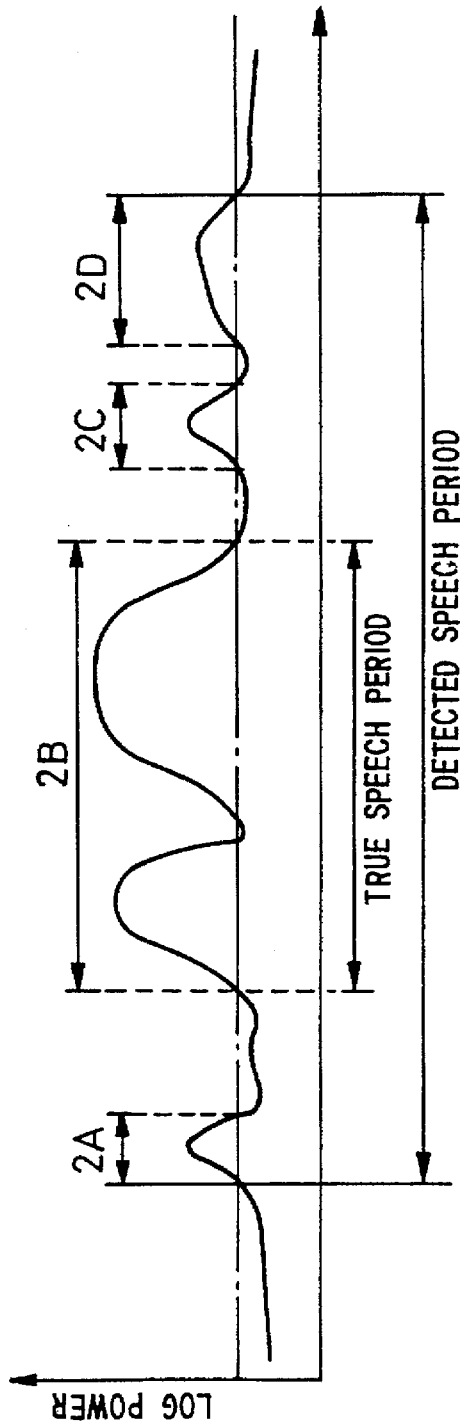
FIG. 2 is a speech power waveform diagram for explaining the detection of a speech period by the prior art.
Figure 3:
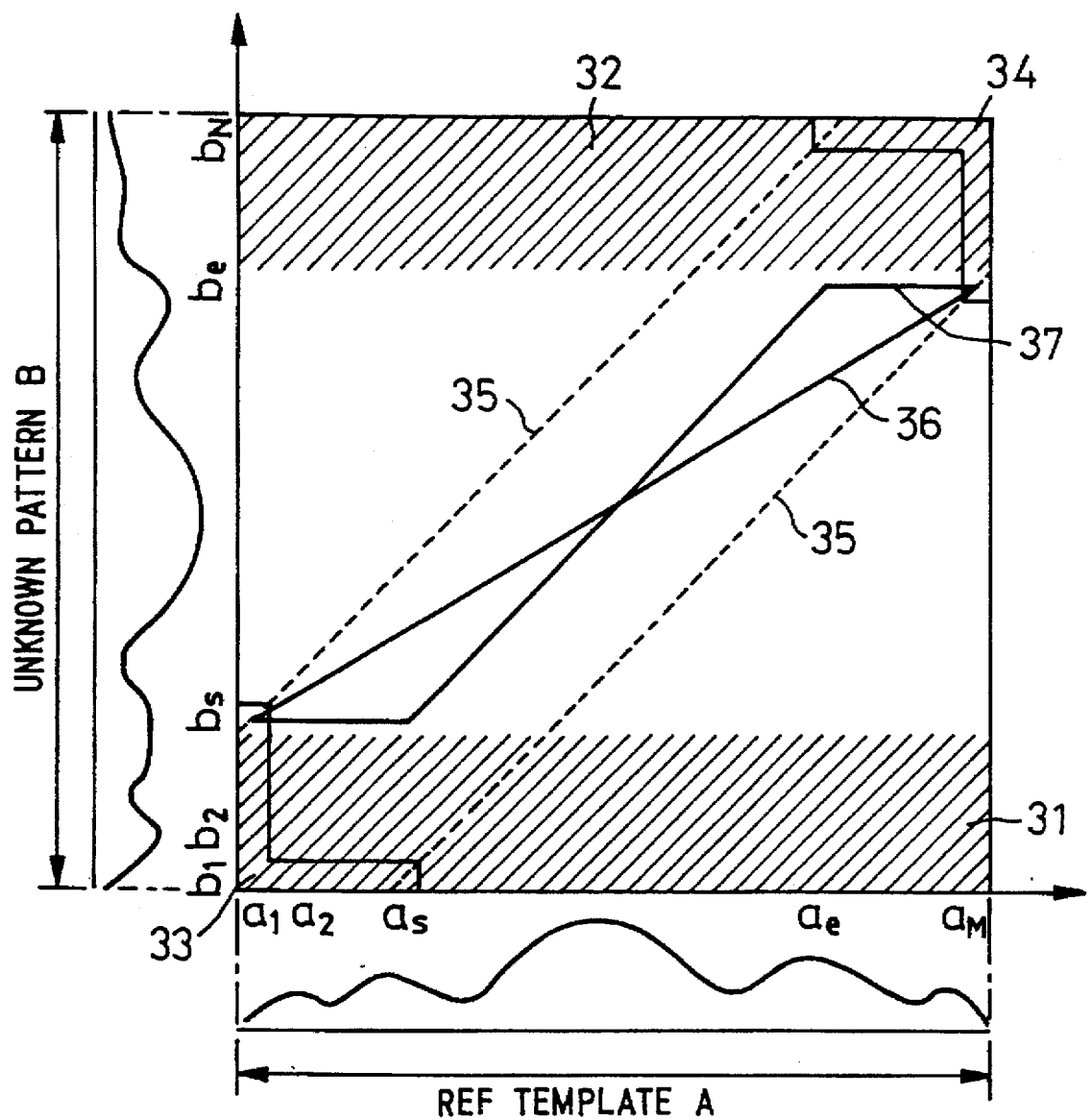
FIG. 3 is a diagram showing a prior art example of a time warping function when a pattern matching operation was conducted by DP matching.

According to the second aspect of the present invention, edge free pattern matching is carried out between partial periods or pattern segments $A'=\{a_s, \ldots, a_e\}$ and $B'=\{b_s, \ldots, b_e\}$ of the reference template A and the unknown speech pattern B which are obtained by eliminating therefrom a fixed length or a length corresponding to the utterance period length from their speech start and end points. This lessens the influence of utterance fluctuations in the edge free matching period and avoids the need for extreme time warping in the speech start and end segments indicated by the solid line 37 in FIG. 3, and hence provides a more accurate time warping function. In the case of a staggered array DTW matching algorithm, the speech start and end segments are extended by extrapolation according to the original speech period, by which the time warping function indicated by the solid line 36 in FIG. 3 can also be obtained in the same form as indicated by the solid line 36 in FIG. 10.

In the case where the speech period is correctly detected and utterance variations in the reference template A and the unknown speech pattern B are small, the conventional matching scheme that does not eliminate the speech start and end segments may sometimes provide a smaller distance measure than does the matching scheme that eliminates the speech start and end segments as described above. In view of this, in the comparison of the unknown speech pattern B and each reference template Am in the second embodiment of the present invention, a comparison is made between a normalized distance measure of the result of matching by the prior art method over the entire speech period and a normalized distance measure of the result of matching over the speech period with its start and end segments eliminated therefrom according to the second aspect of the present invention, and the smaller one of the two distance measures is decided to be the result of matching between the both patterns. This provides increased recognition rate.

Figure 11:
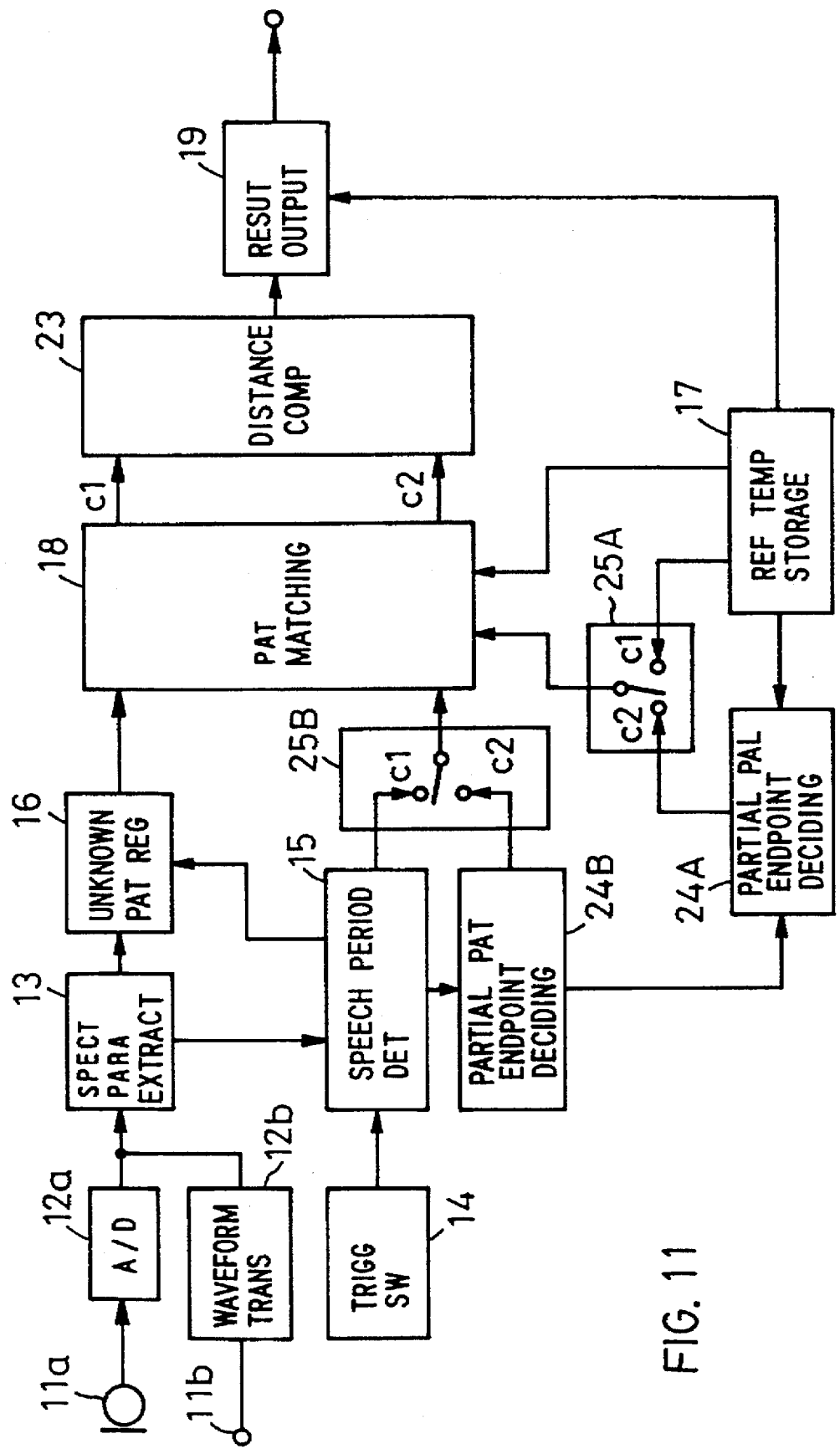
FIG. 11 is a block diagram illustrating the automatic speech recognizer according to the second aspect of the present invention.

Turning next to FIG. 11, an embodiment of the automatic speech recognizer according to the second aspect of the present invention will be described below.

In FIG. 11, the microphone 11a, the A/D converting part 12a, the input terminal 11b, the waveform transforming part 12b, the spectral parameter extracting part 13, the trigger switch 14, the speech endpoint detecting part 15, the unknown speech pattern register 16, the reference template storage part 17 and the pattern matching part 18 are basically identical with those in the first embodiment shown in FIG. 5. The speech endpoint detecting part 15 determines, in the same manner as described previously with respect to FIG. 5, only one first speech start point and only one speech end point on the basis of the spectral parameters extracted in the spectral parameter extracting part 13. The speech period defined by these speech start and end points is a first speech period, which is a true speech period. This can be detected by such a method as described previously in respect of FIG. 7 which premeasures the noise level prior to a speech utterance and defines, as the speech period, the period during which a signal component having a power value larger than the noise level in excess of a fixed threshold value lasts for longer than a fixed period of time.

The unknown speech pattern register 16 stores, as an unknown speech pattern, the spectral parameters from the speech start to end points determined by the speech endpoint detecting part 15. In the reference template storage part 17 there are prestored, as multiple word speech reference templates Am (where m=1, ..., M) each given a label name (a number m, for example) for recognition, multiple speech patterns generated by analyzing multiple word speech sounds for word registration by the same procedure as that for the extraction of an unknown speech pattern in speech recognition. The reference templates each contain also information indicative of the speech period detected by the speech endpoint detecting part 15 about the reference word speech inputted for the word registration, that is, first endpoint information.

Based on the endpoint information about the reference template, a partial pattern endpoint deciding part 24A decides, as second speech endpoints, the positions a fixed length, for example, a semi-syllable length (a phone unit which is about 0.1 sec and corresponds to, for instance, an 8-frame length) away from the start and end points of each reference template. A partial pattern endpoint deciding part 24B decides second speech endpoints that defines a second speech period B' which is the partial period or speech segment of the speech period B detected by the speech endpoint detecting part 15. The second endpoints may be positions a predetermined distance (a predetermined number of frames) away from the detected speech endpoints, respectively, or positions corresponding to the lengths of predetermined rates with respect to the length L of the speech period B. This example shows the case where spectral parameters closest to those at the second speech endpoints determined with respect to the reference template are retrieved from ranges of predetermined lengths from the endpoints of the speech period B, respectively, and are used as the second speech endpoints.

Switches 25A and 25B pass therethrough, as speech period information of the reference template and the unknown speech pattern, either one of the first speech endpoint information and the second speech endpoint information to the pattern patterning part 18. The switches 25A and 25B are interlocked and are switchable between two change-over positions, one for selecting their contacts c1 and the other for selecting their contacts c2. The pattern matching part 18 performs matching between designated ones of the first and second speech periods of the unknown speech pattern B and each reference template Am stored in the unknown speech pattern register 16 and the reference template storage part 17, respectively, and outputs the distance measure between the unknown speech pattern and the reference template, for example, a distance measure in terms of spectral parameters that is defined by the Mahalanobis distance or some other mathematical expressions. The basic form of the pattern matching operation is, for example, DTW matching.

The distance comparing part 23 holds the results of matching operations carried out with the switches 25A and 25B placed at the switching positions c1 and c2, respectively, and detects the smaller one of normalized distance measures obtained as the results of matching between the first speech periods of the partial patterns of the unknown speech pattern and the reference template each defined by the first speech endpoint information and between the second speech periods of the partial patterns of the unknown speech pattern and the reference template each defined by the second speech endpoint information. The distance comparing part 23 provides the smaller distance measure to the result output part 19. The result output part 19 determines the reference template of the smallest one of the distance measures fed from the distance comparing part 23 and outputs the label name of that reference template to the host computer that governs the operation of the automatic speech recognizer.

Next, the operation of the FIG. 11 embodiment will be described. As mentioned above, the reference templates are preregistered which are generated by the same analysis as that for the unknown speech pattern. The digital speech signal waveform fed via the microphone 11a and the A/D converting part 12a is analyzed in the speech spectral parameter extracting part 13, and a portion of the analysis result, for example, the speech signal power is sent to the speech endpoint detecting part 15 for use as information for the speech endpoint detection. Let it be assumed that at this time the trigger switch 14 generates a trigger for the speech endpoint detection through the manipulation by the speaker or host computer that controls the operation of the automatic speech recognizer. The speech endpoint detecting part 15 is initialized by the trigger and begins to detect a speech start point on the basis of the information from the spectral parameter extracting part 13. The speech start point can be detected by, for example, a method in which when the speech power value remains larger than the noise level ($P_N$) in excess of a fixed threshold value, that is, remains larger than $P_N+\Delta P_{th}$ for more than a fixed period of time, the rise-up position $F_s$ of the signal power value is decided to be the speech start point. Then, the speech endpoint detecting part 15 detects a point of attenuation $F_e$ of the speech signal power value (the point where it begins to become smaller than $P_N+\Delta P_{th}$) and decides it to be the speech end point, then finishes its operation. This speech period information $F_s$, $F_e$ is sent as first speech endpoint information to the contact c1 of the switch 25B and at the same time to the unknown speech pattern register 16 as well. In the unknown speech pattern register 16 the result of analysis by the spectral parameter extracting part 13, which corresponds to the first speech period L, is stored as an unknown speech pattern. The partial pattern endpoint deciding part 24B receives the first speech period information $F_s$, $F_e$ from the speech endpoint detecting part 15 and decides and sends second speech period information $F_s'$, $F_e'$ to the contact c2 of the switch 25B.

Figure 12:
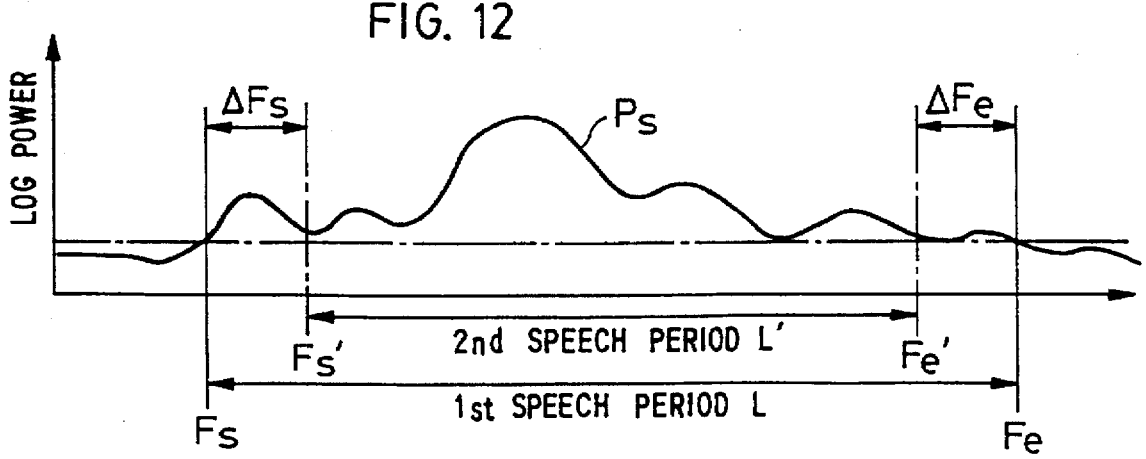
FIG. 12 is a diagram showing the relationship between the positions for the endpoint detection when determining first and second speech periods.

FIG. 12 shows the relationships between the speech period information $F_s$, $F_e$ and $F_s'$, $F_e'$ that are decided by the speech endpoint detecting part 15 and the partial pattern endpoint deciding part 24B, respectively. In FIG. 12 the speech waveform $P_S$ is schematically shown as a short-time log power value for convenience of description. The endpoints $F_s$ and $F_e$ are the start and end positions of the first speech period L decided by the speech endpoint detecting part 15, and the endpoints $F_s'$ and $F_e'$ are the start and end positions of the second speech period L' by the partial pattern endpoint deciding part 24B. The endpoints $F_s'$ and $F_e'$ are at positions where they are displaced from the endpoints $F_s$ and $F_e$ with the periods $\Delta F_s$ and $\Delta F_e$ eliminated from the first speech period L at both ends thereof, respectively. The periods $\Delta F_s$ and $\Delta F_e$ will hereinafter be referred to as elimination period. The elimination periods $\Delta F_s$ and $\Delta F_e$ are each set to a fixed time length, for instance, the length of a semisyllable, say, 0.1 sec or so over which it is empirically known an utterance fluctuation is likely to exert influence. Alternatively, the elimination periods $\Delta F_s$ and $\Delta F_e$ can be set to a value that is obtained by multiplying the entire length L of the detected speech period by a fixed value; for example, if the time interval between the endpoints $F_s$ and $F_e$ is 1.2 sec, the elimination periods $\Delta F_s$ and $\Delta F_e$ are each set to 0.12 sec obtained by multiplying the speech period length L by 1/10 of 1.2 sec. The lengths of the elimination periods $\Delta F_s$ and $\Delta F_e$ need not always be the same. The second speech period information $F_s'$ and $F_e'$ and information one the lengths of the elimination periods $\Delta F_s$ and $\Delta F_e$ thus decided are sent also to the partial pattern endpoint deciding part 24A since the same period lengths as those $\Delta F_s$ and $\Delta F_e$ need to be eliminated from the reference template as well. The partial pattern endpoint deciding part 24A receives, for each reference template to be subjected to pattern matching, the first speech period information (the start and end positions of the reference template) from the reference template storage part 17 at the same time as it is sent to the contact c1 of the switch 25A, then decides second speech information for the reference template by eliminating, from the period of the reference template, periods if the same lengths as those of the elimination periods $\Delta F_s$ and $\Delta F_e$ of the unknown speech pattern decided by the partial pattern endpoint deciding part 24B. The second speech period information thus decided is sent to the contact c2 of the switch 25A. As opposed to this, the lengths of the elimination periods of the unknown speech pattern may be decided by the partial pattern endpoint deciding part 24B on the basis of the lengths of the elimination periods of the reference template decided by the partial pattern endpoint deciding part 24A.

The pattern matching part 18 executes matching between the unknown speech pattern and each reference registered template at the point when the speech spectral parameters and first and second speech period information $F_s$, $F_e$ and $F_s'$, $F_e'$ of the unknown speech pattern are decided. The pattern matching is carried out in two ways for each reference template as mentioned below.

(1) Matching between the unknown speech pattern and the reference template over their true speech periods at the time when the first speech period information is obtained via the switches 25A and 25B connected to the contacts c1

(2) Matching between the unknown speech pattern and the reference template over their partial periods with their start and end segments eliminated at the time when the second speech period information is obtained via the switches 25A and 25B connected to the contacts c2

The pattern matching is carried out using a well-known DTW matching method. As described in Shikano and Aikawa, "Staggered Array DP Matching," Trans. Of the Committee on Speech Research, The Acoustical Society of Japan, S82-15, pp. 113–120, June 1982, when it is necessary to perform pattern matching for the start and end segments of detected speech, the second speech period information need not to be interpolated by the start and end segment patterns because the speech spectral parameters stored in the unknown speech pattern register 16 and the reference template storage part 17 can be used as spectral parameters of the start and end segments.

The normalized distance measures obtained as the result of matching are provided to the distance comparing part 23 via terminals of the same names as the connected terminals of the switches 25A and 25B. The term "normalized" mentioned herein means that the distance measure is normalized by each speech period length in the pattern matching. The distance comparing part 23 compares the normalized distance measures received via the terminals c1 and c2 and decides the smaller distance measure to be the matching result for the current reference template. The results of distance calculations for respective reference patterns are arranged by the result output part 19 in order of increasing distance measure and the label name of the reference template corresponding to the minimum distance measure is provided to the host computer.

Next, a description will be given of the speech recognition procedure in the second embodiment of the present invention shown in FIG. 11. The speech recognition procedure is the same as shown in FIG. 4 as a whole. In the second embodiment, the pattern matching in step S4 in FIG. 4 is carried out following the procedure depicted in FIG. 13 by the use of the scheme described above with respect to FIGS. 11 and 12. In the embodiment of FIG. 13, however, the speech or utterance fluctuation periods $\Delta F_s$ and $\Delta F_e$ are not determined as fixed lengths or fixed rates relative to each other, but instead speech parameters closest to speech spectral parameters at positions a predetermined number of frames away from the start and end points of the reference template are searched for in predetermined ranges at both ends of the unknown speech pattern and the periods from the both ends of the speech pattern to the positions of detected parameters are defined as the utterance fluctuation periods $\Delta F_s$ and $\Delta F_e$, respectively.

In step S51 an m-th reference template Am is selected from the reference template storage part 17. In step S52 the same pattern matching as in the prior art is carried out between the detected unknown speech pattern of the first speech period length L and the reference template Am of the length Km to obtain a first matching distance. Next, in step S53 spectral parameters Rst and Red of eighth frames (about 0.1 sec) from both ends of the reference template Am are extracted. In step S54 spectral parameters closest to those Rst and Red are searched within 15 frames from the both ends of the unknown speech pattern B, and the positions $F_s'$ and $F_e'$ of the detected parameters are determined to be $\Delta F_s$-th and $\Delta F_e$-th frames from the both ends of the speech pattern, respectively. Next, in step S55 a partial pattern of the reference template Am from the eighth to (Km−8)th frame and a partial pattern of the unknown speech pattern B from the $\Delta F_s$- to (L−$\Delta F_e$)th frame are extracted. Then in step S56 pattern matching is carried out between the partial patterns of the reference template Am and the unknown speech pattern B to obtain a second distance. Finally, in step S57 the first and second distances obtained in steps S52 and S56, respectively, are compared with each other and the smaller one of them is decided to be the matching distance between the unknown speech pattern B and the reference template Am, then the procedure returns to step S5 in FIG. 4.

As described above, according to the second aspect of the present invention, when unknown speech is inputted, the first speech period is detected from the information about the input signal and, at the same time, the second speech period is determined by eliminating fixed periods from the first speech period at both ends thereof. The pattern matching with each reference template is carried out first over the entire length of the first speech period and then for the second speech period. Then, the smaller one of two normalized distance measures obtained by the two matching operations is outputted as the distance measure between the unknown speech pattern and the reference template. Thus it is possible to obtain accurate matching results without being affected by the start and end segments of the unknown speech pattern where the distance measure is increased by utterance variations.

The method for preventing the influence of utterance variations at both ends of the speech period, described above in respect of FIG. 13, may be replaced with the method according to the first aspect of the invention described previously with reference to FIG. 8. According to the embodiment of FIG. 8, when the difference d between the speech pattern length L and the reference template length Km is $-\epsilon_2 \leq d \leq \epsilon_1$ in step S43, the matching distance is calculated between the two patterns by the conventional method in step S45, but steps S52 to S57 in FIG. 13 may be used in place of step S45 in FIG. 8.

Next, a description will be given of experimental results of the recognition of actual speech by the first and second methods using the algorithms described with respect to FIGS. 8 and 13, respectively; in the first method pattern matching is carried out for each of partial patterns extracted from the unknown speech pattern at multiple positions, whereas in the second method pattern matching takes place after eliminating from the unknown speech pattern the start and end segments involving utterance variations. In the experiments the words to be recognized were 60 Japanese city names uttered by four adult male speakers. The speech was converted by a filter of the telephone band (300 Hz to 3.4 kHz) and subjected to a short-time LPC cepstrum analysis every 16 msec. The speech period was detected using the short-time log power.

To clarify the effectiveness of speech recognition by the first method of the present invention, the words (60 Japanese city names) were uttered twice in the three different:

(1) names after a meaningless utterance "eh" (which means "well" in Japanese);
(2) names before a meaningless utterance "desu" in Japanese (which means "it is" in Japanese); and
(3) names between the two meaningless utterances "eh" and "desu."

The recognition rates by the conventional recognition method using only one speech period were 2%, 50% and 3% for the words uttered in the above-mentioned situations (1), (2) and (3), respectively. In contrast thereto, the recognition rates by the first method of the present invention were 83%, 80% and 47%—this demonstrates outstanding effectiveness of the method.

Incidentally, the first method of the present invention permits speech recognition, eliminating from the speech period not only such intentionally uttered unnecessary speech as mentioned above but also the lip noise, breathing noise or background noise period that occurs regardless of the intention of a speaker.

Next, in the tests by the second method of the invention, the 60 Japanese city names were each uttered in isolation and the elimination period lengths $\Delta F_s$ and $\Delta F_e$ at speech endpoints, which define the second speech period L', were both fixed to 0.128 sec. The pattern matching method used is a starting-point fixed, end-point free Staggered Array DTW matching method. With the conventional recognition method in which the speech period is fixed only to the first speech period L that is the true value as detected, the recognition error rate was 8%, whereas with the method of the present invention using also the result of matching for the second speech period L' the recognition error rate dropped to 5%—this confirms the effectiveness of the present invention.

As described above, according to the speech recognition method of the first aspect of the present invention, when unknown speech is inputted, the speech period is detected on the basis of the signal power of the input speech or similar simple information, and the difference in length between the detected speech period and the reference template for comparison is used to make a check to see if the detected speech period is accompanied by unnecessary signal periods. If it is decided that the detected speech period is not accompanied by unnecessary signal periods, matching is carried out between the entire length of the detected unknown speech pattern and the reference template. When it is decided that the detected speech period is accompanied by unnecessary signal periods, partial patterns are extracted from the detected unknown speech pattern at multiple positions and multiple matching is carried out between the extracted partial patterns and the reference template. By this matching, the minimum distance measure between the partial patterns inferred to be approximate to the true speech period with the unnecessary signal periods eliminated therefrom and the reference template can be used as the matching result, making it possible to avoid recognition errors that are attributable to speech period detection errors.

This method permits significant reduction of recognition errors even when the word speech to be recognized is inputted into, for example, the microphone of a telephone handset close to the speaker's mouth and the speech is accompanied by a lip noise, breathing noise or similar unnecessary sound.

According to the second aspect of the present invention, recognition errors by utterance variations at speech endpoints which arise irrespective of the speaker's intention can be avoided by the addition of a simple operation to the speech endpoint detecting algorithm. Additionally, since the speech start and end segments, which require edge free matching, are eliminated from the detected unknown speech pattern, recognition performance can be improved without using the edge free matching algorithm. The speech recognition method according to the second aspect of the invention is suitable for speaker-dependent speech recognition because in this method the length of the unknown speech pattern is expected to be close to the length of the reference template to some extent.

It will be apparent that many modifications and variations may be effected without departing from the scope of the novel concepts of the present invention.

What is claimed is:

1. A word speech recognition method which performs pattern matching between an unknown speech pattern and multiple reference templates and detects that one of said multiple reference templates which corresponds to the smallest one of distance measures between said unknown speech pattern and said multiple reference templates, said method comprising the steps of:

(a) analyzing an unknown input digital speech signal for each frame and extracting therefrom a sequence of spectral parameters;

(b) detecting start and end points of the speech period of said input digital speech signal and obtaining said sequence of spectral parameters of said input digital speech signal for said speech period as said unknown speech pattern;

(c) selecting one of said multiple reference templates;

(d) calculating a difference d between the period length of said unknown speech pattern and the period length of said selected reference template;

(e) comparing said difference d with a predetermined threshold length $\epsilon_1$, where said $\epsilon_1$ is a positive value;

(e-1) when said difference d exceeds the threshold length $\epsilon_1$, extracting from said unknown speech pattern its partial patterns of about the same length as the period length of said selected reference template, each starting at a different position in said unknown speech pattern; and (e-2) performing pattern matching between said partial patterns and said selected reference template to detect the distances between them;

(f) determining the smallest one of said detected distances to be the distance between said unknown speech pattern and said selected reference template; and (g) repeating said steps (c) to (f) for each of said multiple reference templates and outputting, as the result of recognition of said input digital speech signal, the label name of said reference template which provides the smallest one Of the distances between said unknown speech pattern and all of said reference templates.

2. The word speech recognition method of claim 1, wherein said step (e-1) includes a step of extracting said partial patterns of about the same length as that of said selected reference template from said unknown speech pattern at said speech start and end points thereof, respectively.

3. The word speech recognition method of claim 2, wherein said step (e-1) includes a step of extracting another partial pattern of about the same length as that of said selected reference template from said unknown speech pattern at substantially the middle thereof.

4. The word speech recognition method of claim 2, wherein said step (e-2) is a step of performing end edge free pattern matching for said partial pattern extracted from said unknown speech pattern at said start point thereof and start edge free pattern matching for said partial pattern extracted from said unknown speech pattern at the end point thereof.

5. The word speech recognition method of claim 3, wherein said step (e-2) is a step of performing edge free pattern matching for said partial pattern extracted from said unknown speech pattern at substantially the middle thereof.

6. The word speech recognition method of claim 1, 2, or 3, which further comprises a step of measuring the noise power of a non-speech period of said digital speech signal prior to the inputting thereof, and wherein said step (a) includes a step of obtaining the power of said input digital speech signal for each frame by said speech analysis and said step (b) includes a step of detecting, as said start point of said speech period of said input digital speech signal, a first rise position of the power of said input digital speech signal where it exceeds a threshold level which is the sum of said noise power and a predetermined value and, as said end point of said speech period of the input digital speech signal, any one of fall positions of the power of said input digital speech signal where it decreases below said threshold level.

7. The word speech recognition method of claim 1, 2, or 3, wherein said step (e) further comprises the steps of:
   (e-3) setting the distance between said unknown speech pattern and said selected reference template to a maximum value when said difference d is smaller than a predetermined second threshold length $-\epsilon_2$, where $\epsilon_2$ is a positive value; and
   (e-4) performing pattern matching between said unknown speech pattern and said selected reference template over their entire lengths when said difference d is in the range between said threshold lengths $-\epsilon_2$ and $\epsilon_1$.

8. The word speech recognition method of claim 1, which further comprises a step of measuring the noise power of a non-speech period of said digital speech signal prior to the inputting thereof, and wherein: said step (a) includes a step of obtaining the power of said input digital speech signal for each frame by said speech analysis; said step (b) includes a step of detecting, as said start point of said speech period of said input digital speech signal, a first rise position of the power of said input digital speech signal where it exceeds a threshold level which is the sum of said noise power and a predetermined value and, as said end point of said speech period of said input digital speech signal, any one of fall positions of the power of said input digital speech signal where it decreases below said threshold level; and said step (e) further comprises a step (e-3) of extracting said partial patterns of about the same length as that of said selected reference template from said unknown speech pattern within the range from each rise position of said unknown speech pattern to said end point of its speech period when said difference d is larger than said threshold length $\epsilon_1$.

9. The work speech recognition method of claim 1, 2, or 3, wherein said step (e) further comprises the steps of:
   (e-3) setting the distance between said unknown speech pattern and said selected reference template to a maximum value when said difference d is smaller than a predetermined second threshold length $-\epsilon_2$, where $\epsilon_2$ is a positive value; and
   (e-4) when said difference d is in the range between said threshold lengths $-\epsilon_2$ and $\epsilon_1$:
      (e-4-1) performing pattern matching between said unknown speech pattern and said selected reference template over their entire periods thereof to obtain a first distance between them;
      (e-4-2) extracting a reference template partial period from said selected reference template, except its start and end segments;
      (e-4-3) extracting a speech pattern partial period from said unknown speech pattern, except its start and end segments;
      (e-4-4) performing pattern matching between said reference template partial period and said speech pattern partial period to obtain a second distance between said unknown speech pattern and said selected reference template; and
      (e-4-5) comparing said first and second distances and deciding the smaller one of them to be the distance between said unknown speech pattern and said selected reference template.

10. The word speech recognition method of claim 9, wherein the lengths of said start and end segments of said selected reference template and said unknown speech pattern in said steps (e-4-2) and (e-4-3) are predetermined lengths.

11. The word speech recognition method of claim 9, wherein the lengths of said start and end segments of said selected reference template are predetermined lengths, said step (e-4-2) includes a step of detecting first and second spectral parameters at the start and end points of said reference template partial period, respectively, and said step (e-4-3) includes a step of detecting third and fourth spectral parameters closest to said first and second spectral parameters in periods of predetermined lengths from the start and end points of said unknown speech pattern and a step of extracting, as said speech pattern partial period, that period of said unknown speech period which is defined by said third and fourth spectral parameters.

12. A word speech recognizer which performs pattern matching between an unknown speech pattern and multiple reference templates and detects that one of said multiple reference templates which corresponds to the smallest one of distance measures between said unknown speech pattern and said multiple reference templates, said recognizer comprising:
   input means for inputting a digital speech signal;
   speech spectral parameter extracting means for analyzing said digital speech signal for each frame and for extracting therefrom a sequence of speech spectral parameters;
   speech endpoint detecting means for detecting speech endpoints of the speech period of said digital speech signal on the basis of said sequence of speech spectral parameters outputted from said speech spectral parameter extracting means;
   unknown speech pattern register means for determining start and end points of the speech period of said unknown speech pattern on the basis of said detected speech endpoints and for storing a sequence of spectral parameters of said speech period as said unknown speech pattern;
   reference template storage means for prestoring multiple reference templates for speech recognition;
   period length comparing means for comparing the speech period length of each of said stored multiple reference templates and the speech period length of said unknown speech pattern stored in said unknown speech pattern register means;
   input pattern extracting means for extracting partial patterns from said unknown speech pattern stored in said unknown speech pattern register means, each starting at a different position, on the basis of the comparison result from said period length comparing means and the output result from said unknown speech pattern register means;
   pattern matching means for performing pattern matching between each of said multiple partial patterns and said each reference template and for outputting multiple distance measures calculated between them;
   distance comparing means for comparing said multiple distance measures from said pattern matching and for outputting the smallest distance measure as the distance measure between said unknown speech pattern and said each reference template; and
   result output means for outputting the label name of said reference template which provides the distance measure decided to be the smallest among those between all of said multiple reference templates and said unknown speech pattern.

13. A word speech recognition method which performs pattern matching between an unknown speech pattern and multiple reference templates and detects that one of said multiple reference templates which corresponds to the smallest one of distance measures between said unknown speech pattern and said multiple reference templates, said method comprising the steps of:

(a) analyzing an unknown input digital speech signal for each frame and for extracting therefrom a sequence of spectral parameters;

(b) detecting start and end points of the speech period of said input digital speech signal and obtaining said sequence of spectral parameters of said input digital speech signal for said speech period as said unknown speech pattern;

(c) selecting one of said multiple reference templates;

(d) performing pattern matching between said unknown speech pattern and said selected reference template over their entire lengths to obtain a first distance between them;

(e) extracting a reference template partial period from said selected template, except its start and end segments;

(f) extracting a speech pattern partial period from said unknown speech pattern, except its start and end segments;

(g) performing pattern matching between said reference template partial period and said speech pattern partial period to obtain a second distance between said unknown speech pattern and said selected reference template;

(h) comparing said first and second distances and deciding the smaller one of them to be the distance between said unknown speech pattern and said selected reference template; and (i) repeating said steps (c) to (h) for each of said multiple reference templates and outputting, as the result of recognition of said input digital speech signal, the label name of said reference template which provides the smallest one of the distances between said unknown speech pattern and all of said multiple reference templates.

14. The word speech recognition method of claim 13, wherein the lengths of said start and end segments of said selected reference template and said unknown speech pattern in said steps (e) and (f) are predetermined lengths.

15. The word speech recognition method of claim 13, wherein the lengths of said start and end segments of said selected reference template are predetermined lengths, said step (e) includes a step of detecting first and second spectral parameters at the start and end points of said reference template partial period, respectively, and said step (f) includes a step of detecting third and fourth spectral parameters closest to the first and second spectral parameters in periods of predetermined lengths from the start and end points of said unknown speech pattern and a step of extracting, as said speech pattern partial period, that period of the unknown speech period which is defined by said third and fourth spectral parameters.

16. A word speech recognizer which performs pattern matching between an unknown speech pattern and multiple reference templates and detects that one of said multiple reference templates which corresponds to the smallest one of distance measures between said unknown speech pattern and said multiple reference templates, said recognizer comprising:

input means for inputting a digital speech signal;

speech spectral parameter extracting means for analyzing said digital speech signal for each frame and for extracting therefrom sequence of speech spectral parameters;

speech period detecting means for detecting the speech period of said unknown speech pattern as a first speech period on the basis of said sequence of speech spectral parameters outputted from said speech spectral parameter extracting means and for determining both ends of said first speech period as first speech endpoints;

unknown speech pattern register means for storing a sequence of spectral parameters of said first speech period as said unknown speech pattern;

unknown pattern partial period determining means for determining second speech endpoints that define a second speech period, by eliminating start and end segments from said first speech period detected by said speech period detecting means;

reference template storage means for prestoring multiple reference templates for speech recognition, together with information about first speech endpoints defining their speech periods as first speech periods;

reference template partial period determining means for determining second endpoints that define a second speech period, by eliminating start and end segments from said first speech period of each of said multiple reference templates selected from said reference template storage means;

switching means for selecting said first and second endpoints of said unknown speech pattern and said each selected reference pattern from said speech period detecting means and said reference template pattern storage means, thereby selecting said first and second speech periods of said unknown speech pattern from said unknown pattern register means and said each selected reference template from said reference template storage means;

pattern matching means for performing pattern matching between said first speech periods of said unknown speech pattern and said each selected reference template selected by said switching means to obtain a first distance and for performing pattern matching between said second speech periods of said unknown speech pattern and said each selected reference template selected by said switching means to obtain a second distance;

distance comparing means for comparing said first and second distances to determine the smaller one of them to be the distance measure between said unknown speech pattern and said each selected reference template; and result output means for comparing all the distance measures outputted from said distance comparing means as the results of matching of said unknown speech pattern with said multiple reference templates, for determining that one of said multiple reference templates which is decided to provide the smallest distance measure, and for outputting the label name of said determined reference template.

* * * * *